United States Patent
Briand et al.

(10) Patent No.: US 12,173,189 B2
(45) Date of Patent: Dec. 24, 2024

(54) COATING COMPOSITIONS

(71) Applicant: IMERTECH SAS, Paris (FR)

(72) Inventors: Amandine Briand, Lostwithiel (GB); Helen Dollani, Par Cornwall (GB); Anabelle Elton-Legrix, St. Austell Cornwall (GB); Lieven Verstuyft, Oosterzele (BE); Emmanuel Bertin, Tournefeuille (FR); Petra Fritzen, Moers (DE)

(73) Assignee: ImerTech SAS, Paris (FR)

( * ) Notice: Subject to any disclaimer, the term of this patent is extended or adjusted under 35 U.S.C. 154(b) by 1002 days.

(21) Appl. No.: 17/047,088

(22) PCT Filed: Apr. 12, 2019

(86) PCT No.: PCT/EP2019/059403
§ 371 (c)(1),
(2) Date: Oct. 13, 2020

(87) PCT Pub. No.: WO2019/197601
PCT Pub. Date: Oct. 17, 2019

(65) Prior Publication Data
US 2021/0155811 A1    May 27, 2021

(30) Foreign Application Priority Data
Apr. 13, 2018 (EP) .................................. 18305465

(51) Int. Cl.
| C09D 7/61 | (2018.01) |
| C08K 3/26 | (2006.01) |
| C08K 3/34 | (2006.01) |
| C08L 27/06 | (2006.01) |

(52) U.S. Cl.
CPC .................. *C09D 7/61* (2018.01); *C08K 3/26* (2013.01); *C08K 3/346* (2013.01); *C08L 27/06* (2013.01); *C08K 2003/265* (2013.01); *C08K 2201/005* (2013.01); *C08K 2201/019* (2013.01)

(58) Field of Classification Search
CPC ... C09D 7/61; C09D 5/00; C08K 3/26; C08K 3/346; C08K 2003/265; C08K 2201/005; C08K 2202/019; C08L 27/06
See application file for complete search history.

(56) References Cited

U.S. PATENT DOCUMENTS

| 2007/0123629 A1 | 5/2007 | Sare et al. |
| 2008/0168925 A1 | 7/2008 | Sare et al. |
| 2010/0263576 A1 | 10/2010 | Sare et al. |
| 2011/0168057 A1 | 7/2011 | Gittins et al. |
| 2016/0257837 A1* | 9/2016 | Zhang ...................... C08K 5/11 |

FOREIGN PATENT DOCUMENTS

| CN | 102108232 A | 6/2011 | |
| CN | 103890106 A | 6/2014 | |
| CN | 105419500 A * | 3/2016 | .......... C09D 109/08 |
| CN | 106381757 A | 2/2017 | |
| DE | 202016006686 U1 * | 12/2016 | |
| EP | 3272817 A1 * | 1/2018 | ............. A01K 15/00 |
| JP | 2002-327393 A | 11/2002 | |
| JP | 2015-57316 A | 3/2015 | |
| WO | WO 2006/105189 A1 | 10/2006 | |
| WO | WO 2010/143068 A1 | 12/2010 | |
| WO | 2014150460 A1 | 9/2014 | |

OTHER PUBLICATIONS

International Search Report and Written Opinion dated Jun. 19, 2019, in International Application No. PCT/EP2019/059403.
Afnor, 1st Issue; Paints and varniches, Water-borne coating materials and coating systems for interior walls and ceilings; EP Standard; Feb. 2002 (9 pages).
Chetelat, Eric., "Titanium Dioxide Substitution", OMYA; Nov. 8, 2017 (52 pages).
Al-Turaif, Hamad; "Surface coating properties of different shape and size pigment blends", Progress in Organic Coatings 65 (2009) pp. 322-327.

* cited by examiner

*Primary Examiner* — Pegah Parvini
(74) *Attorney, Agent, or Firm* — Finnegan, Henderson Farabow, Garrett & Dunmer, LLP

(57) ABSTRACT

TiO$_2$-free coating compositions and mineral blends for use in TiO$_2$-free coating compositions.

18 Claims, No Drawings

COATING COMPOSITIONS

CLAIM FOR PRIORITY

This application is a U.S. national phase entry under 35 U.S.C. § 371 from PCT International Application No. PCT/EP2019/059403, filed Apr. 12, 2019, which claims the benefit of priority of European Patent Application No. 18305465.9, filed Apr. 13, 2018, from both of which this application claims priority and both of which are incorporated herein by reference.

TECHNICAL FIELD

The present invention is directed to coating compositions, for example paints, and mineral blends for use in coating compositions, which are substantially free of $TiO_2$.

BACKGROUND TO THE INVENTION $TiO_2$ is commonly used in coating compositions, such as paints or sealants, as an opacifying, matting and whitening mineral filler. It is now desirable to produce coating compositions, for example paints, which are substantially free of $TiO_2$. This is due to the expense and perceived environmental impact of $TiO_2$. However, coating compositions which are substantially free of $TiO_2$ typically have reduced opacity compared to coating compositions comprising substantial quantities of $TiO_2$. It has also been found to be particularly difficult to produce substantially $TiO_2$-free coating compositions combining high values of opacity with low gloss (e.g. for matt paints).

SUMMARY OF THE INVENTION

According to a first aspect, the present invention is directed to a coating composition comprising a mineral blend and no greater than about 1.0 wt. % $TiO_2$, based on the total weight of the coating composition, wherein the mineral blend comprises: ground calcium carbonate as a matting mineral, a whitening mineral or both; and calcined kaolin, for example flash calcined kaolin, as an opacifying mineral, a whitening mineral or both.

According to a second aspect, the present invention is directed to a paint which is substantially free of $TiO_2$, the paint comprising a mineral blend and binder, and having: an opacity of at least about 95.0%, for example at least about 97.0%, at 8 $m^2$/L according to ISO 6504-3; and 85° gloss, at 100 μm wet film thickness, of no greater than about 7.0 according to ISO 2813, for example, at a PVC of at least about 60%, or at a PVC of at least about 70%; and optionally L* of at least about 95.0, at 1500 μm wet film thickness and/or a scrub resistance in Class 1 or 2 according to ISO 11998 or Type A or B according to BS 3900.

According to a third aspect, the present invention is directed to a substrate coated with a coating composition, for example, paint, according to the first and/or second aspects of the invention.

According to a fourth aspect, the present invention is directed to use of a mineral blend comprising ground calcium carbonate and calcined kaolin, for example flash calcined kaolin, in a $TiO_2$-free paint having: an opacity of at least about 95.0%, for example at least about 97.0%, at 8 $m^2$/L according to ISO 6504-3; and 85° gloss, at 100 μm wet film thickness, of no greater than about 7.0 according to ISO 2813, for example, at a PVC of at least about 60%, for example, at a PVC of at least about 70%; and optionally L* of at least about 95.0 at 1500 μm wet film thickness and/or a scrub resistance in Class 1 or Class 2 according to ISO 11998 or Type A or B according to BS 3900.

According to a fifth aspect, the present invention is directed to a mineral blend for use in a $TiO_2$-free paint, the mineral blend comprising, based on the total weight of the mineral blend: between about 10 wt. % and about 40 wt. %, for example between about 10 wt. % and about 35 wt. %, of calcium carbonate as a matting mineral, a whitening mineral or both; between about 20 wt. % and about 60 wt. %, for example between about 20 wt. % and about 50 wt. %, of calcined kaolin, for example flash calcined kaolin, as an opacifying mineral, a whitening mineral or both; and less than about 3.0 wt. % $TiO_2$.

According to a sixth aspect, the present invention is directed to a mineral blend for use in a $TiO_2$-free paint, the mineral blend comprising, based on the total weight of the mineral blend: between about 35 wt. % and about 65 wt. %, for example between about 45 wt. % and about 60 wt. %, of opacifying minerals; between about 10 wt. % and about 45 wt. %, for example between about 15 wt. % and about 40 wt. %, of matting minerals; between about 10 wt. % and about 45 wt. %, for example between about 10 wt. % and about 35 wt. %, of whitening minerals; and less than about 3.0 wt. % $TiO_2$.

According to a seventh aspect, the present invention is directed to a coating composition comprising a mineral blend and no greater than about 1.0 wt. % $TiO_2$, based on the total weight of the coating composition, wherein the mineral blend comprises calcined kaolin, for example flash calcined kaolin, as an opacifying mineral, a whitening mineral or both.

According to a eighth aspect, the present invention is directed to a coating composition comprising a mineral blend and no greater than about 1.0 wt. % $TiO_2$, based on the total weight of the coating composition, wherein the mineral blend comprises: calcined kaolin, for example flash calcined kaolin, as an opacifying mineral, a whitening mineral or both; and at least one matting mineral.

According to a ninth aspect, the present invention is directed to a coating composition comprising a mineral blend and no greater than about 1.0 wt. % $TiO_2$, based on the total weight of the coating composition, wherein the mineral blend comprises: calcined kaolin, for example flash calcined kaolin, as an opacifying mineral, a whitening mineral or both; and at least one matting mineral selected from the following group: diatomaceous earth (for example, natural diatomaceous earth or flux calcined diatomaceous earth), talc, perlite, quartz, mica, chlorite, wollastonite.

DETAILED DESCRIPTION OF THE INVENTION

It has surprisingly been found that substantially $TiO_2$-free coating compositions, for example, paints, comprising mineral blends comprising calcined kaolin, for example flash calcined kaolin, as an opacifying mineral, a whitening mineral or both, can provide high optical opacities in combination with low gloss values, comparable to the properties achievable using known coating compositions comprising substantial quantities of $TiO_2$. It may be that the mineral blends comprise at least one matting mineral in addition to calcined kaolin. It may be that the mineral blends comprise ground calcium carbonate as a matting mineral, a whitening mineral or both, in addition to calcined kaolin.

Coating Composition

The coating composition may be a paint. The paint may be a water-based paint or an oil-based paint. The coating composition may be a varnish. The coating composition may be a primer. The coating composition may be a sealant.

The coating composition, for example, paint, is substantially $TiO_2$-free. The skilled person will appreciate that a substantially $TiO_2$-free coating composition is not necessarily completely devoid of $TiO_2$ but may still comprise some $TiO_2$. Nevertheless, the quantity of $TiO_2$ present in the substantially $TiO_2$-free coating composition is typically less than a threshold. For example, the coating composition may comprise less than about 1.0 wt. % $TiO_2$, or less than about 0.5 wt. % $TiO_2$, or less than about 0.1 wt. % $TiO_2$, based on the total weight of the coating composition. In certain embodiments, the coating composition comprises effectively 0 wt. % $TiO_2$, based on the total weight of the coating composition.

The coating composition typically comprises at least the mineral blend and a binder. The coating composition may additionally comprise a liquid vehicle in which the mineral blend is dispersed. The liquid vehicle may comprise water. Additionally or alternatively, the coating composition may comprise one or more of the following additives: rheology modifiers, thickeners, viscosity buffers, solvents, dispersants, defoamers or anti-foamers, biocides, pH adjustors, anti-freeze coalescents, opaque polymers.

The binder may comprise binder resin. Suitable binders include, for example, acrylic emulsions and copolymers (e.g., styrene acrylic emulsions), chlorinated polymers (e.g., vinyl chlorides), or polyurethane dispersions, and the like. The binder may comprise one or more inorganic binders, such as, for example, silicates, phosphates, borates, and the like.

Suitable dispersants include polyacrylate dispersant, for example, polyacrylate ammonium salts.

Suitable anti-foamers and defoamers include, for example, blends of surfactants, tributyl phosphate, fatty polyoxyethylene esters plus fatty alcohols, fatty acid soaps, silicone emulsions and other silicone containing compositions, waxes and inorganic particulates in mineral oil, blends of emulsified hydrocarbons and other compounds sold commercially to carry out this function.

Suitable biocides include, for example, oxidizing biocides such as chlorine gas, chlorine dioxide gas, sodium hypochlorite, sodium hypobromite, hydrogen, peroxide, peracetic oxide, ammonium bromide/sodium hypochlorite, or non-oxidising biocides such as GLUT (Glutaraldehyde, CAS No 90045-36-6), ISO (CIT/MIT) (Isothiazolinone, CAS No 55956-84-9 & 96118-96-6), ISO (BIT/MIT) (Isothiazolinone), ISO (BIT) (Isothiazolinone, CAS No 2634-33-5), DBNPA, BNPD (Bronopol), NaOPP, CARBAMATE, THIONE (Dazomet), EDDM—dimethanol (O-formal), HT—Triazine (N-formal), THPS—tetrakis (O-formal), TMAD—diurea (N-formal), metaborate, sodium dodecylbenene sulphonate, thiocyanate, organosulphur, sodium benzoate and other compounds sold commercially for this function.

Suitable rheology modifiers, or thickeners, include cellulose-derived rheology modifiers, for example, microfibrillated cellulose, hydroxymethyl cellulose, hydroxyethyl cellulose, hydroxypropyl cellulose, hydroxypropylmethyl cellulose, carboxymethyl cellulose or a mixture thereof. Suitable non-cellulose-derived rheology modifiers include one or more of emulsion copolymers, dicyanamide, triols, polyoxyethylene ether, urea, sulphated castor oil, polyvinyl pyrrolidone, sodium alginate, xanthan gum, and sodium silicate.

Suitable coalescants include ester alcohols.

The coating composition may comprise one or more pigments (other than $TiO_2$). A pigment is a substance which provides primary colouration of the coating composition, for example a paint, whether white or a colour shade. The term 'pigment' includes finely ground, natural or synthetic, inorganic or organic, insoluble particles which, when dispersed in a liquid vehicle, i.e., solvent, may provide, in addition to colour, some or all desired properties of a paint, such as opacity, hardness, durability and corrosion resistance. Suitable pigments include, but are not limited to, carbon black, calcium sulphate, iron oxide, and the copper-complex phthalo blue. Other suitable pigments for providing colour will be readily apparent to persons skilled in the art.

The coating composition, for example paint, may further include dye. The distinction between powders which are pigments and those which are dyes is generally considered to be on the basis of solubility: pigments being insoluble and dispersed in the material, dyes being soluble or in solution when used.

An example of an opaque polymer additive, for example a hollow sphere opaque polymer additive, is ROPAQUE™ available from The Dow Chemical Company.

The coating composition may comprise at least about 25 wt. %, for example, at least about 30 wt. %, or at least about 40 wt. %, or at least about 41 wt. %, of liquid vehicle (e.g., water) and additives, based on the total weight of the coating composition. The coating composition may comprise no greater than about 70 wt. %, for example, no greater than about 65 wt. %, or no greater than about 60 wt. %, or no greater than about 56 wt. %, of liquid vehicle (e.g., water) and additives, based on the total weight of the coating composition. The coating composition may comprise from about 25 wt. % to about 70 wt. %, for example, from about 30 wt. % to about 65 wt. %, or from about 35 wt. % to about 60 wt. %, or from about 41 wt. % to about 56 wt. %, of liquid vehicle (e.g., water) and additives, based on the total weight of the coating composition.

The coating composition may comprise at least about 20 wt. %, for example, at least about 25 wt. %, or at least about 30 wt. %, or at least about 35 wt. %, of the mineral blend, based on the total weight of the coating composition. The coating composition may comprise no greater than about 75 wt. %, for example, no greater than about 70 wt. %, or no greater than about 65 wt. %, or no greater than about 60 wt. %, or no greater than about 55 wt. %, or no greater than about 50 wt. %, or no greater than about 48 wt. %, of the mineral blend, based on the total weight of the coating composition. The coating composition may comprise from about 20 wt. % to about 75 wt. %, for example, from about 30 wt. % to about 65 wt. %, or from about 35 wt. % to about 50 wt. %, or from about 35 wt. % to about 48 wt. %, of the mineral blend, based on the total weight of the coating composition.

The coating composition may comprise at least about 30 wt. %, for example at least about 35 wt. %, or at least about 40 wt. %, or at least about 44 wt. %, of mineral blend and binder, based on the total weight of the coating composition. The coating composition may comprise no greater than about 75 wt. %, for example, no greater than about 70 wt. %, or no greater than about 65 wt. %, or no greater than about 60 wt. %, or no greater than about 59 wt. %, of mineral blend and binder, based on the total weight of the coating composition. The coating composition may comprise from about 30 wt. % to about 75 wt. %, for example, from about 35 wt. % to about 70 wt. %, or from about 40 wt. % to about 65 wt. %, or from about 40 wt. % to about 65 wt. %, or from about 44 wt. % to about 60 wt. %, or from about 44 wt. % to about 59 wt. %, of mineral blend and binder, based on the total weight of the coating composition.

Pigment volume concentration (PVC) is the ratio of the volume of solid particles to the total volume of solid particles plus solid (i.e., non-volatile) binder, expressed as a percentage.

The coating composition may have a pigment volume concentration (PVC) of at least about 60%, for example, at least about 65%, or at least about 70%, or at least about 75%, or at least about 80%, or at least about 85%, or at least about 90%. The coating composition may have a PVC of from about 60% to about 90%, for example, from about 70% to about 90%, or from about 70% to about 85%, or from about 70% to about 80%, or from about 75% to about 80%.

The coating composition may have a PVC of greater than the critical pigment volume concentration (CPVC). The coating composition may have a PVC of at least about 110% of the CPVC, for example, at least about 120% of the CPVC, or at least about 130% of the CPVC, or at least about 140% of the CPVC, or at least about 150% of the CPVC, or at least about 160% of the CPVC. In such embodiments, the coating composition may have a PVC of no greater than about 200% of the CPVC, for example, no greater than about 175% of the CPVC.

The coating composition, for example paint, may be provided in a container such as a can, tub, bottle or pouch. The container may be formed from any material suitable for containing the coating composition such as, for example, metal, plastic and/or glass. Accordingly, the coating composition may be provided as canned paint.

Mineral Blend

The mineral blend typically comprises at least calcined kaolin, for example flash calcined kaolin. The calcined kaolin, for example flash calcined kaolin, it typically present as an opacifying mineral, a whitening mineral, or both.

The mineral blend may also comprise ground calcium carbonate. The ground calcium carbonate is typically present as a matting mineral or a whitening mineral or both.

The minerals in the mineral blend are typically present in particulate form. Unless otherwise stated, particle size properties referred to herein for minerals are as measured in a well-known manner by sedimentation of the particulate mineral in a fully dispersed condition in an aqueous medium using, for example, a Sedigraph 5100 machine as supplied by Micromeritics Instruments Corporation, Norcross, Georgia, USA (website: www.micromeritics.com), referred to herein as a "Micromeritics Sedigraph 5100 unit", and based on application of Stokes' Law. Such a machine provides measurements and a plot of the cumulative percentage by weight of particles having a size, referred to in the art as the 'equivalent spherical diameter' (e.s.d.), less than given e.s.d. values. The mean particle size $d_{50}$ is the value determined in this way of the particle e.s.d. at which there are 50% by weight of the particles which have an equivalent spherical diameter less than that $d_{50}$ value. The $d_{90}$ value is the value at which 90% by weight of the particles have an e.s.d. less than that $d_{90}$ value. Particle size properties may be determined in accordance with ISO 13317-3, or any method equivalent thereto.

Alternatively, where stated, the particle size properties referred to herein for the inorganic particulate materials are as measured by the well-known conventional method employed in the art of laser light scattering, using, for example, a Malvern Mastersizer S machine as supplied by Malvern Instruments Ltd (or by other methods which give essentially the same result) or a Microtrac laser diffraction machine, available from Microtrac, Inc. In the laser light scattering technique, the size of particles in powders, suspensions and emulsions may be measured using the diffraction of a laser beam, based on an application of Mie theory. Such a machine provides measurements and a plot of the cumulative percentage by volume of particles having a size, referred to in the art as the 'equivalent spherical diameter' (e.s.d), less than given e.s.d values. The mean particle size $d_{50}$ is the value determined in this way of the particle e.s.d at which there are 50% by volume of the particles which have an equivalent spherical diameter less than that $d_{50}$ value. The $d_{90}$ value is the value at which 90% by volume of the particles have an e.s.d. less than that $d_{90}$ value. Particle size properties may be determined in accordance with ISO 13320-1, or any method equivalent thereto.

Calcium Carbonate

Calcium carbonate encompasses ground calcium carbonate (GCC) and precipitated calcium carbonate (PCC).

Ground calcium carbonate may comprise ground naturally occurring calcium carbonate from sources such as marble, limestone, dolomite and chalk. Ground calcium carbonate may have a blocky particle morphology. Particles of ground calcium carbonate may be non-porous.

Precipitated calcium carbonate may be prepared by a process in which calcium carbonate is calcined to produce calcium oxide ("quicklime"), which is then slaked with water to produce an aqueous slurry of calcium hydroxide, the calcium hydroxide finally being carbonated with a carbon-dioxide-containing gas to produce precipitated calcium carbonate. Precipitated calcium carbonate may also be ground. Particles of precipitated calcium carbonate may be porous in morphology.

The ground calcium carbonate present in the mineral blend may have a $d_{50}$ of at least about 1.0 μm, for example, at least about 1.5 μm, or at least about 2.0 μm, or at least about 2.5 μm, or at least about 3.0 μm, or at least about 3.5 μm, or at least about 4.0 μm, or at least about 4.5 μm, or at least about 5.0 μm, or at least about 6.0 μm, or at least about 7.0 μm, or at least about 8.0 μm, or at least about 9.0 μm, or at least about 10.0 μm, or at least about 11.0 μm. Additionally or alternatively, the ground calcium carbonate may have a $d_{50}$ of no greater than about 30.0 μm, for example, no greater than about 25.0 μm, or no greater than about 20.0 μm, or no greater than about 15.0 μm, or no greater than about 11.0 μm, or no greater than about 7.0 μm, or no greater than about 5.0 μm.

The ground calcium carbonate may have a $d_{50}$ of from about 1.0 μm to about 5.0 μm, for example, from about 1.5 μm to about 4.0 μm, or from about 2.0 μm to about 4.0 μm, e.g. around 2.7 μm.

The ground calcium carbonate may have a surface area of from about 2.0 m$^2$/g to about 8.0 μm, for example, from about 2.5 to about 7.0 m$^2$/g, or from about 3.0 to about 6.0 m$^2$/g, e.g. around 4.4 m$^2$/g.

For example the ground calcium carbonate may have a $d_{50}$ of from about 2.0 μm to about 4.0 μm and a surface area from about 3.0 to about 6.0 m$^2$/g.

The surface area of the minerals may be measured by BET nitrogen absorption according to DIN ISO 9277, for example using a TriStar machine, available from Micromeritics.

The ground calcium carbonate may have a $d_{50}$ of from about 1.0 μm to about 10.0 μm, for example, from about 2.0

μm to about 8.0 μm, or from about 3.0 μm to about 7.0 μm, or from about 4.0 μm to about 5.0 μm, e.g. around 4.7 μm.

The ground calcium carbonate may have a surface area of from about 0.5 μm to about 5.0 m$^2$/g, for example, from about 0.5 to about 3.0 m$^2$/g, or from about 1.0 to about 2.5 m$^2$/g, e.g. around 1.7 m$^2$/g.

For example the ground calcium carbonate may have a $d_{50}$ of from about 4.0 μm to about 5.0 μm and a surface area from about 1.0 to about 2.5 m$^2$/g.

The ground calcium carbonate may have a $d_{50}$ of from about 1.0 μm to about 12.0 μm, for example, from about 3.0 μm to about 10.0 μm, or from about 4.0 μm to about 8.0 μm, or from about 5.0 μm to about 7.0 μm, e.g. around 6.5 μm.

The ground calcium carbonate may have a surface area of from about 0.3 m$^2$/g to about 4.0 m$^2$/g, for example, from about 0.5 to about 2.5 m$^2$/g, or from about 0.5 to about 2.0 m$^2$/g, e.g. around 1.3 m$^2$/g.

For example the ground calcium carbonate may have a $d_{50}$ of from about 5.0 μm to about 7.0 μm and a surface area from about 0.5 to about 2.0 m$^2$/g.

The ground calcium carbonate may have a $d_{50}$ of from about 3.0 μm to about 20.0 μm, for example, from about 5.0 μm to about 18.0 μm, or from about 7.0 μm to about 15.0 μm, or from about 9.0 μm to about 12.0 μm, e.g. around 11.0 μm.

The ground calcium carbonate may have a surface area of from about 0.3 m$^2$/g to about 4.0 m$^2$/g, for example, from about 0.5 to about 2.5 m$^2$/g, or from about 0.5 to about 2.0 m$^2$/g, e.g. around 1.3 m$^2$/g.

For example the ground calcium carbonate may have a $d_{50}$ of from about 9.0 μm to about 12.0 μm and a surface area from about 0.5 to about 2.0 m$^2$/g.

The mineral blend may comprise at least about 1 wt. %, for example, at least about 5 wt. %, or at least about 10 wt. %, of ground calcium carbonate, based on the total weight of the mineral blend. The mineral blend may comprise no greater than about 60 wt. %, for example, no greater than about 50 wt. %, or no greater than about 40 wt. %, or no greater than about 35 wt. %, of ground calcium carbonate, based on the total weight of the mineral blend. The mineral blend may comprise from about 5 wt. % to about 60 wt. %, for example, from about 10 wt. % to about 50 wt. %, or from about 10 wt. % to about 40 wt. %, or from about 10 wt. % to about 35 wt. %, of ground calcium carbonate, based on the total weight of the mineral blend.

The coating composition may comprise at least about 1 wt. %, for example, at least about 2 wt. %, or at least about 3 wt. %, or at least about 4 wt. %, or at least about 5 wt. %, of ground calcium carbonate, based on the total weight of the coating composition. The coating composition may comprise no greater than about 30 wt. %, for example, no greater than about 25 wt. %, or no greater than about 20 wt. %, or no greater than about 15 wt. %, of ground calcium carbonate, based on the total weight of the coating composition. The coating composition may comprise from about 1 wt. % to about 30 wt. %, for example, from about 5 wt. % to about 25 wt. %, or from about 5 wt. % to about 20 wt. %, or from about 5 wt. % to about 15 wt. %, of ground calcium carbonate, based on the total weight of the coating composition.

The mineral blend may comprise ground calcium carbonate in two or more different forms, for example, ground calcium carbonate having two or more different particle sizes (e.g. $d_{50}$). The mineral blend may comprise ground calcium carbonate in three or more different forms, for example, ground calcium carbonate having three or more different particle sizes (e.g. $d_{50}$).

The mineral blend may comprise: ground calcium carbonate having a first $d_{50}$ of from about 1.0 μm to about 10.0 μm, for example, from about 3.0 μm to about 6.0 μm; and ground calcium carbonate having a second $d_{50}$ of from about 5.0 μm to about 20.0 μm, for example, from about 8.0 μm to about 15.0 μm. The mineral blend may comprise ground calcium carbonate having a first $d_{50}$ of about 4.7 μm and ground calcium carbonate having a second $d_{50}$ of about 11.0 μm.

The mineral blend may comprise: ground calcium carbonate having a first $d_{50}$ of from about 1.0 μm to about 10.0 μm, for example, from about 3.0 μm to about 6.0 μm, and a surface area of from about 0.5 to about 5.0 m$^2$/g; and ground calcium carbonate having a second $d_{50}$ of from about 5.0 μm to about 20.0 μm, for example, from about 8.0 μm to about 15.0 μm, and a surface area of from 0.3 to 4.0 m$^2$/g. The mineral blend may comprise ground calcium carbonate having a first $d_{50}$ of about 4.7 μm and a surface area of about 1.7 m$^2$/g and ground calcium carbonate having a second $d_{50}$ of about 11.0 μm and a surface area of about 1.3 m$^2$/g.

The mineral blend may comprise: from about 10 wt. % to about 35 wt. %, for example, from about 15 wt. % to about 30 wt. %, e.g., about 23 wt. %, of ground calcium carbonate having a first $d_{50}$ of from about 1.0 μm to about 10.0 μm, for example, from about 3.0 μm to about 6.0 μm; and from about 1 wt. % to about 15 wt. %, for example, from about 5 wt. %, to about 10 wt. %, e.g., about 8 wt. %, of ground calcium carbonate having a second $d_{50}$ of from about 5.0 μm to about 20.0 μm, for example, from about 8.0 μm to about 15.0 μm. The mineral blend may comprise about 23 wt. % of ground calcium carbonate having a first $d_{50}$ of about 4.7 μm and about 8 wt. % of ground calcium carbonate having a second $d_{50}$ of about 11.0 μm.

The coating composition may comprise: from about 1 wt. % to about 20 wt. %, for example, from about 5 wt. % to about 15 wt. %, e.g., about 11 wt. %, of ground calcium carbonate having a first $d_{50}$ of from about 1.0 μm to about 10.0 μm, for example, from about 3.0 μm to about 6.0 μm; and from about 1 wt. % to about 10 wt. %, for example, from about 2 wt. %, to about 6 wt. %, e.g., about 4 wt. %, of ground calcium carbonate having a second $d_{50}$ of from about 5.0 μm to about 20.0 μm, for example, from about 8.0 μm to about 15.0 μm. The coating composition may comprise about 11 wt. % of ground calcium carbonate having a first $d_{50}$ of about 4.7 μm and about 4 wt. % of ground calcium carbonate having a second $d_{50}$ of about 11.0 μm.

Calcium carbonate may also encompass surface modified calcium carbonate (MCC). MCC is typically formed by processing ground calcium carbonate (for example, in the form of an aqueous mineral slurry treated with water-soluble acid and gaseous $CO_2$) to induce particle shape and surface structure modifications, particularly increased surface porosity. In certain embodiments, the mineral blend and coating composition comprise MCC. In certain embodiments, the mineral blend and coating composition do not comprise MCC. That is to say, the mineral blend and/or coating composition may be substantially (e.g., completely) MCC-free.

Kaolin

Kaolin encompasses hydrous kaolin and calcined kaolin, for example flash calcined kaolin. Kaolin is a layered silicate clay mineral having the chemical formula $Al_2Si_2O_5(OH)_4$. Hydrous kaolin retains bound water. Calcined kaolin may be formed by heating hydrous kaolin at or above around 650° C. to remove the bound water. Calcination of kaolin typically takes several minutes to hours to be completed. Flash calcined kaolin is formed (in a flash calciner) by rapid calcination of hydrous kaolin, typically over a few seconds or even less than a second.

The calcined kaolin present in the mineral blend may have a $d_{50}$ of at least about 0.5 μm, for example, at least about 0.6 μm, or at least about 0.7 μm, or at least about 0.8 μm, or at least about 0.9 μm, or at least about 1.0 μm, or at least about 1.1 μm. Additionally or alternatively, the calcined kaolin may have a $d_{50}$ of no greater than about 5.0 μm, for example, no greater than about 4.0 μm, or no greater than about 3.0 μm, or no greater than about 2.0 μm, or no greater than about 1.6 μm. The calcined kaolin present in the mineral blend may have a $d_{50}$ of from about 0.5 μm to about 5.0 μm, for example, from about 0.6 μm to about 4.0 μm, or from about 0.7 μm to about 3.0 μm, or from about 0.7 μm to about 2.0 μm, or from about 0.7 μm to about 1.1 μm.

For example the calcined kaolin is a calcined kaolin having a $d_{50}$ of about 1.1 μm; and/or of the calcined kaolin is a flash calcined kaolin having a $d_{50}$ of about 1.6 μm.

The calcined kaolin may have a surface area of from about 6.0 m$^2$/g to about 15.0 m$^2$/g, for example, from about 8.0 to about 13.0 m$^2$/g, or from about 9.0 to about 12.0 m$^2$/g, e.g. around 10.5 or about 11.0 m$^2$/g.

For example the calcined kaolin may have a $d_{50}$ of from about 0.7 μm to about 2.0 μm and a surface area from about 9.0 to about 12.0 m$^2$/g.

The calcined kaolin may have a porous particle morphology. Particles of calcined kaolin typically have external pores. Particles of flash calcined kaolin typically have external and internal pores.

The mineral blend may comprise at least about 10 wt. %, for example, at least about 15 wt. %, or at least about 20 wt. %, or at least about 23 wt. %, of calcined kaolin, for example flash calcined kaolin, based on the total weight of the mineral blend. The mineral blend may comprise no greater than about 80 wt. %, for example, no greater than about 70 wt. %, or no greater than about 60 wt. %, or no greater than about 50 wt. %, of calcined kaolin, for example flash calcined kaolin, based on the total weight of the mineral blend. The mineral blend may comprise from about 10 wt. % to about 80 wt. %, for example, from about 15 wt. % to about 70 wt. %, or from about 20 wt. % to about 60 wt. %, or from about 20 wt. % to about 50 wt. %, or from about 23 wt. % to about 50 wt. %, of calcined kaolin, for example flash calcined kaolin, based on the total weight of the mineral blend.

The coating composition may comprise at least about 4 wt. %, for example, at least about 6 wt. %, or at least about 8 wt. %, or at least about 10 wt. %, or at least about 11 wt. %, of calcined kaolin, for example flash calcined kaolin, based on the total weight of the coating composition. The coating composition may comprise no greater than about 40 wt. %, for example, no greater than about 35 wt. %, or no greater than about 30 wt. %, or no greater than about 25 wt. %, of calcined kaolin, for example flash calcined kaolin, based on the total weight of the coating composition. The coating composition may comprise from about 4 wt. % to about 40 wt. %, for example, from about 6 wt. % to about 35 wt. %, or from about 8 wt. % to about 30 wt. %, or from about 10 wt. % to about 25 wt. %, of calcined kaolin, for example flash calcined kaolin, based on the total weight of the coating composition.

The mineral blend may comprise: from about 10 wt. % to about 80 wt. % of calcined kaolin, for example flash calcined kaolin, based on the total weight of the mineral blend; and from about 5 wt. % to about 60 wt. % of ground calcium carbonate, based on the total weight of the mineral blend. The mineral blend may comprise: from about 15 wt. % to about 70 wt. % of calcined kaolin, for example flash calcined kaolin, based on the total weight of the mineral blend; and from about 10 wt. % to about 50 wt. % of ground calcium carbonate, based on the total weight of the mineral blend. The mineral blend may comprise: from about 20 wt. % to about 50 wt. % of calcined kaolin, for example flash calcined kaolin, based on the total weight of the mineral blend; and from about 10 wt. % to about 40 wt. % of ground calcium carbonate, based on the total weight of the mineral blend. The mineral blend may comprise: from about 23 wt. % to about 50 wt. % of calcined kaolin, for example flash calcined kaolin, based on the total weight of the mineral blend; and from about 10 wt. % to about 35 wt. % of ground calcium carbonate, based on the total weight of the mineral blend.

The coating composition may comprise: from about 4 wt. % to about 40 wt. % of calcined kaolin, for example flash calcined kaolin, based on the total weight of the coating composition; and from about 1 wt. % to about 30 wt. % of ground calcium carbonate, based on the total weight of the coating composition. The coating composition may comprise: from about 6 wt. % to about 35 wt. % of calcined kaolin, for example flash calcined kaolin, based on the total weight of the coating composition; and from about 5 wt. % to about 25 wt. % of ground calcium carbonate, based on the total weight of the coating composition. The coating composition may comprise: from about 8 wt. % to about 30 wt. % of calcined kaolin, for example flash calcined kaolin, based on the total weight of the coating composition; and from about 5 wt. % to about 20 wt. % of ground calcium carbonate, based on the total weight of the coating composition. The coating composition may comprise: from about 10 wt. % to about 25 wt. % of calcined kaolin, for example flash calcined kaolin, based on the total weight of the coating composition; and from about 5 wt. % to about 15 wt. % of ground calcium carbonate, based on the total weight of the coating composition.

The mineral blend may comprise: from about 10 wt. % to about 35 wt. %, for example, from about 15 wt. % to about 30 wt. %, e.g., about 23 wt. %, of ground calcium carbonate having a $d_{50}$ of from about 1.0 μm to about 10.0 μm, for example, from about 3.0 μm to about 6.0 μm; and from about 10 wt. % to about 80 wt. %, for example, from about 15 wt. % to about 70 wt. %, or from about 20 wt. % to about 60 wt. %, or from about 20 wt. % to about 50 wt. %, or from about 23 wt. % to about 50 wt. %, of calcined kaolin, for example flash calcined kaolin, based on the total weight of the mineral blend.

The coating composition may comprise: from about 1 wt. % to about 20 wt. %, for example, from about 5 wt. % to about 15 wt. %, e.g., about 11 wt. %, of ground calcium carbonate having a $d_{50}$ of from about 1.0 μm to about 10.0 μm, for example, from about 3.0 μm to about 6.0 μm; and from about 4 wt. % to about 40 wt. %, for example, from about 6 wt. % to about 35 wt. %, or from about 8 wt. % to about 30 wt. %, or from about 10 wt. % to about 25 wt. %, of calcined kaolin, for example flash calcined kaolin, based on the total weight of the coating composition.

The mineral blend may comprise: from about 1 wt. % to about 50 wt. %, for example, from about 5 wt. % to about 40 wt. %, or from about 10 wt. % to about 35 wt. %, of ground calcium carbonate having a $d_{50}$ of from about 0.5 μm to about 5.0 μm, for example, from about 1.0 μm to about 3.0 μm; and from about 10 wt. % to about 80 wt. %, for example, from about 15 wt. % to about 70 wt. %, or from about 20 wt. % to about 60 wt. %, or from about 30 wt. % to about 60 wt.

%, or from about 40 wt. % to about 60 wt. %, of calcined kaolin, for example flash calcined kaolin, based on the total weight of the mineral blend.

The coating composition may comprise: from about 1 wt. % to about 20 wt. %, for example, from about 4 wt. % to about 18 wt. %, or from about 5 wt. % to about 15 wt. %, of ground calcium carbonate having a $d_{50}$ of from about 1.0 μm to about 10.0 μm, for example, from about 3.0 μm to about 6.0 μm; and from about 5 wt. % to about 40 wt. %, for example, from about 10 wt. % to about 30 wt. %, or from about 12 wt. % to about 25 wt. %, or from about 16 wt. % to about 24 wt. %, of calcined kaolin, for example flash calcined kaolin, based on the total weight of the coating composition.

The mineral blend may comprise: from about 10 wt. % to about 35 wt. %, for example, from about 15 wt. % to about 30 wt. %, e.g., about 23 wt. %, of ground calcium carbonate having a first $d_{50}$ of from about 1.0 μm to about 10.0 μm, for example, from about 3.0 μm to about 6.0 μm; from about 1 wt. % to about 15 wt. %, for example, from about 5 wt. %, to about 10 wt. %, e.g., about 8 wt. %, of ground calcium carbonate having a second $d_{50}$ of from about 5.0 μm to about 20.0 μm, for example, from about 8.0 μm to about 15.0 μm; and from about 10 wt. % to about 80 wt. %, for example, from about 15 wt. % to about 70 wt. %, or from about 20 wt. % to about 60 wt. %, or from about 20 wt. % to about 50 wt. %, or from about 23 wt. % to about 50 wt. %, of calcined kaolin, for example flash calcined kaolin, based on the total weight of the mineral blend.

The coating composition may comprise: from about 1 wt. % to about 20 wt. %, for example, from about 5 wt. % to about 15 wt. %, e.g., about 11 wt. %, of ground calcium carbonate having a first $d_{50}$ of from about 1.0 μm to about 10.0 μm, for example, from about 3.0 μm to about 6.0 μm; from about 1 wt. % to about 10 wt. %, for example, from about 2 wt. %, to about 6 wt. %, e.g., about 4 wt. %, of ground calcium carbonate having a second $d_{50}$ of from about 5.0 μm to about 20.0 μm, for example, from about 8.0 μm to about 15.0 μm; and from about 4 wt. % to about 40 wt. %, for example, from about 6 wt. % to about 35 wt. %, or from about 8 wt. % to about 30 wt. %, or from about 10 wt. % to about 25 wt. %, of calcined kaolin, for example flash calcined kaolin, based on the total weight of the coating composition.

Other Minerals

The mineral blend may comprise one or more minerals other than calcined kaolin, for example flash calcined kaolin, and ground calcium carbonate. For example, the mineral blend may comprise one or more other minerals in addition to ground calcium carbonate and calcined kaolin, for example flash calcined kaolin. The mineral blend may comprise at least one further mineral, for example, at least two further minerals, or at least three further minerals, or at least four further minerals, or at least five further minerals. The at least one further mineral, for example, at least two further minerals, or at least three further minerals, or at least four further minerals, or at least five further minerals, may be selected from the following group: hydrous kaolin, precipitated calcium carbonate, natural diatomaceous earth, flux calcined diatomaceous earth, talc, wollastonite, perlite, mica, quartz, chlorite.

For example, the mineral blend may comprise in addition to ground calcium carbonate and calcined kaolin, at least a mineral chosen from perlite and diatomaceous earth (for example, natural diatomaceous earth or flux calcined diatomaceous earth).

For example, the mineral blend may comprise in addition to ground calcium carbonate and calcined kaolin, at least two minerals chosen from hydrous kaolin, precipitated calcium carbonate, natural diatomaceous earth, flux calcined diatomaceous earth, talc, wollastonite, perlite, mica, quartz, chlorite The mineral blend may comprise less than about 3.0 wt. % $TiO_2$, for example, less than about 2.0 wt. %, or less than about 1.0 wt. %, of $TiO_2$, based on the total weight of the mineral blend. The mineral blend may comprise substantially no $TiO_2$.

The hydrous kaolin may have a $d_{50}$ of at least about 0.2 μm, for example, at least about 0.3 μm, or at least about 0.4 μm, or at least about 0.5 μm, or at least about 0.6 μm, or at least about 0.7 μm. Additionally or alternatively, the hydrous kaolin may have a $d_{50}$ of no greater than about 5.0 μm, for example, no greater than about 4.0 μm, or no greater than about 3.0 μm, or no greater than about 2.0 μm, or no greater than about 1.0 μm, or no greater than about 0.7 μm. The hydrous kaolin may have a $d_{50}$ of from about 0.2 μm to about 5.0 μm, for example, from about 0.5 μm to about 2.0 μm. The hydrous kaolin may have a $d_{50}$ of about 0.7 μm.

The hydrous kaolin may have a surface area of from about 8.0 m²/g to about 20.0 m²/g, for example, from about 10.0 to about 18.0 m²/g, or from about 12.0 to about 16.0 m²/g, e.g. around 14.0 m²/g.

For example the hydrous kaolin may have a $d_{50}$ of from about 0.5 μm to about 2.0 μm and a surface area from about 13.0 to about 15.0 m²/g.

The precipitated calcium carbonate may have a $d_{50}$ of at least about 0.5 μm, for example, at least about 1.0 μm, or at least about 1.2 μm, or at least about 1.4 μm, or at least about 1.5 μm. Additionally or alternatively, the precipitated calcium carbonate may have a $d_{50}$ of no greater than about 5.0 μm, for example, no greater than about 4.0 μm, or no greater than about 3.0 μm, or no greater than about 2.0 μm, or no greater than about 1.5 μm. The precipitated calcium carbonate may have a $d_{50}$ of from about 0.5 μm to about 5.0 μm, for example, from about 1.0 μm to about 3.0 μm. The precipitated calcium carbonate may have a $d_{50}$ of about 1.5 μm.

The precipitated calcium carbonate may have a surface area of from about 6.0 m²/g to about 14.0 m²/g, for example, from about 8.0 to about 12.0 m²/g, or from about 9.0 to about 11.0 m²/g, e.g. around 10.0 m²/g.

For example the ground calcium carbonate may have a $d_{50}$ of from about 1.0 μm to about 3.0 μm and a surface area from about 9.0 to about 11.0 m²/g.

The natural diatomaceous earth may have a $d_{50}$ of at least about 0.5 μm, for example, at least about 1.0 μm, or at least about 5.0 μm, or at least about 10.0 μm, as determined by laser light scattering. Additionally or alternatively, the natural diatomaceous earth may have a $d_{50}$ of no greater than about 25.0 μm, for example, no greater than about 20.0 μm, or no greater than about 18.0 μm, or no greater than about 16.0 μm, or no greater than about 14.0 μm, as determined by laser light scattering. The natural diatomaceous earth may have a $d_{50}$ of from about 5.0 μm to about 20.0 μm, for example, a $d_{50}$ of from about 5.0 μm to about 15.0 μm, or from about 10.0 μm to about 15.0 μm, as determined by laser light scattering. The natural diatomaceous earth may have a $d_{50}$ of about 12.0 μm, as determined by laser light scattering.

The flux calcined diatomaceous earth may have a $d_{50}$ of at least about 1.0 μm, for example, at least about 5.0 μm, or at least about 10.0 μm, or at least about 12.0 μm, or at least about 15.0 μm, as determined by laser light scattering. Additionally or alternatively, the flux calcined diatomaceous earth may have a $d_{50}$ of no greater than about 30.0 µm, for example, no greater than about 25.0 µm, or no greater than about 20.0 µm, or no greater than about 17.0 µm, or no greater than about 15.0 µm, as determined by laser light scattering. The flux calcined diatomaceous earth may have a $d_{50}$ of from about 1.0 µm to about 30.0 µm, for example, or from about 10.0 µm to about 20.0 µm, as determined by laser light scattering. The flux calcined diatomaceous earth may have a $d_{50}$ of about 15.0 µm, as determined by laser light scattering. The flux calcined diatomaceous earth may have a surface area of from about 0.3 m²/g to about 4.0 m²/g, for example, from about 0.5 to about 3.0 m²/g, or from about 1.0 to about 3.0 m²/g, e.g. around 2.0 m²/g.

For example the flux calcined diatomaceous earth may have a $d_{50}$ of from about 10.0 µm to about 20.0 µm as determined by laser light scattering and a surface area from about 0.5 to about 3.0 m²/g.

The flux calcined diatomaceous earth may have a $d_{90}$ of at least about 20.0 µm, as determined by laser light scattering. Additionally or alternatively, the flux calcined diatomaceous earth may have a $d_{90}$ of no greater than about 50.0 µm, as determined by laser light scattering. The flux calcined diatomaceous earth may have a $d_{90}$ of from about 20.0 µm to about 50.0 µm, as determined by laser light scattering.

The talc may have a $d_{50}$ of at least about 1.0 µm, for example, at least about 5.0 µm, or at least about 8.0 µm, or at least about 9.0 µm, or at least about 9.4 µm. Additionally or alternatively, the talc may have a $d_{50}$ of no greater than about 30.0 µm, for example, no greater than about 25.0 µm, or no greater than about 20.0 µm, or no greater than about 15.0 µm, or no greater than about 10.0 µm, or no greater than about 9.4 µm. The talc may have a $d_{50}$ of from about 1.0 µm to about 30.0 µm, for example, from about 5.0 µm to about 15.0 µm. The talc may have a $d_{50}$ of about 9.4 µm.

The talc may have a surface area of from about 1.0 m²/g to about 6.0 m²/g, for example, from about 1.5 to about 4.0 m²/g, or from about 2.0 to about 3.0 m²/g, e.g. around 2.7 m²/g.

For example the talc may have a $d_{50}$ of from about 5.0 µm to about 15.0 µm and a surface area from about 1.5 to about 4.0 m²/g.

By "talc" is meant the mineral composed or comprised of hydrated magnesium silicate. Talc may comprise the structurally and chemically similar mineral chlorite. In certain embodiments, talc may comprise at least about 1 wt. %, for example, or at least about 5 wt. %, or at least about 10 wt. %, or at least about 20 wt. %, or at least about 30 wt. %, or at least about 35 wt. %, chlorite, based on the total weight of the talc. In certain embodiments, talc may comprise no greater than about 90 wt. %, for example, no greater than about 80 wt. %, or no greater than about 70 wt. %, or no greater than about 65 wt. %, of chlorite, based on the total weight of the talc. In certain embodiments, talc may comprise from about 1 wt. % to about 90 wt. %, for example, from about 10 wt. % to about 80 wt. %, or from about 35 wt. % to about 65 wt. %, chlorite, based on the total weight of the talc.

The wollastonite may have a $d_{50}$ of at least about 1.0 µm, for example, at least about 2.0 µm, or at least about 3.0 µm, or at least about 4.0 µm, or at least about 4.5 µm, as determined by laser light scattering. Additionally or alternatively, the wollastonite may have a $d_{50}$ of no greater than about 20.0 µm, for example, no greater than about 15.0 µm, or no greater than about 10.0 µm, or no greater than about 6.0 µm, or no greater than about 5.0 µm, or no greater than about 4.5 µm, as determined by laser light scattering. The wollastonite may have a $d_{50}$ of from about 1.0 µm to about 20.0 µm, for example, from about 2.0 µm to about 6.0 µm, as determined by laser light scattering. The wollastonite may have a $d_{50}$ of about 4.5 µm, as determined by laser light scattering. The wollastonite may have a surface area of from about 1.0 m²/g to about 6.0 m²/g, for example, from about 1.5 to about 5.0 m²/g, or from about 2.0 to about 4.0 m²/g, e.g. around 3.0 m²/g.

For example the wollastonite may have a $d_{50}$ of from about 2.0 µm to about 6.0 µm and a surface area from about 2.0 to about 4.0 m²/g.

The wollastonite may have a $d_{90}$ of at least about 10.0 µm, as determined by laser light scattering. Additionally or alternatively, the wollastonite may have a $d_{90}$ of no greater than about 30.0 µm, for example, no greater than about 20.0 µm, as determined by laser light scattering. The wollastonite may have a $d_{90}$ of from about 10.0 µm to about 30.0 µm, for example, from about 10.0 µm to about 20.0 µm, as determined by laser light scattering.

The perlite may have a $d_{50}$ of at least about 5.0 µm, for example, at least about 10.0 µm, or at least about 15.0 µm, or at least about 20.0 µm, or at least about 25.0 µm, as determined by laser light scattering. Additionally or alternatively, the perlite may have a $d_{50}$ of no greater than about 50.0 µm, for example, no greater than about 40.0 µm, or no greater than about 30.0 µm, or no greater than about 25.0 µm, as determined by laser light scattering. The perlite may have a $d_{50}$ of from about 5.0 µm to about 50.0 µm, for example, from about 20.0 µm to about 30.0 µm, as determined by laser light scattering. The perlite may have a $d_{50}$ of about 25.0 µm, as determined by laser light scattering.

The perlite may have a surface area of from about 1.0 m²/g to about 8.0 m²/g, for example, from about 3.0 to about 7.0 m²/g, or from about 4.0 to about 5.0 m²/g, e.g. around 4.7 m²/g.

For example the perlite may have a $d_{50}$ of from about 20.0 µm to about 30.0 µm as determined by laser light scattering and a surface area from about 3.0 to about 7.0 m²/g.

The mica may have a $d_{50}$ of at least about 5.0 µm, for example, at least about 10.0 µm, or at least about 15.0 µm, or at least about 18.0 µm, or at least about 20.0 µm. Additionally or alternatively, the mica may have a $d_{50}$ of no greater than about 50.0 µm, for example, no greater than about 40.0 µm, or no greater than about 30.0 µm, or no greater than about 25.0 µm, or no greater than about 22.0 µm, or no greater than about 20.0 µm. The mica may have a $d_{50}$ of from about 5.0 µm to about 50.0 µm, for example, from about 15.0 µm to about 25.0 µm. The mica may have a $d_{50}$ of about 20.0 µm.

The mica may have a $d_{90}$ of at least about 30.0 µm. Additionally or alternatively, the mica may have a $d_{90}$ of no greater than about 40.0 µm. The mica may have a $d_{90}$ of from about 30.0 µm to about 40.0 µm.

The quartz may have a $d_{50}$ of at least about 5.0 µm, for example, at least about 10.0 µm, or at least about 15.0 µm, or at least about 18.0 µm, or at least about 20.0 µm. Additionally or alternatively, the quartz may have a $d_{50}$ of no greater than about 50.0 µm, for example, no greater than about 40.0 µm, or no greater than about 30.0 µm, or no greater than about 25.0 µm, or no greater than about 22.0 µm, or no greater than about 20.0 µm. The quartz may have a $d_{50}$ of from about 5.0 µm to about 50.0 µm, for example, from about 15.0 µm to about 25.0 µm. The quartz may have a $d_{50}$ of about 20.0 µm.

The quartz may have a $d_{90}$ of at least about 30.0 µm. Additionally or alternatively, the quartz may have a $d_{90}$ of no greater than about 40.0 µm. The quartz may have a $d_{90}$ of from about 30.0 µm to about 40.0 µm.

The chlorite may have a $d_{50}$ of at least about 5.0 μm, for example, at least about 10.0 μm, or at least about 15.0 μm, or at least about 18.0 μm, or at least about 20.0 μm. Additionally or alternatively, the chlorite may have a $d_{50}$ of no greater than about 50.0 μm, for example, no greater than about 40.0 μm, or no greater than about 30.0 μm, or no greater than about 25.0 μm, or no greater than about 22.0 μm, or no greater than about 20.0 μm. The chlorite may have a $d_{50}$ of from about 5.0 μm to about 50.0 μm, for example, from about 15.0 μm to about 25.0 μm. The chlorite may have a $d_{50}$ of about 20.0 μm.

The chlorite may have a $d_{90}$ of at least about 20.0 μm, for example, at least about 30.0 μm. Additionally or alternatively, the chlorite may have a $d_{90}$ of no greater than about 40.0 μm. The chlorite may have a $d_{90}$ of from about 20.0 μm to about 40.0 μm, for example, from about 30.0 μm to about 40.0 μm.

The hydrous kaolin may have a platey particle morphology. The precipitated calcium carbonate may have a porous particle morphology. The natural diatomaceous earth may have a porous particle morphology. The flux calcined diatomaceous earth may have a porous and/or disc-shaped particle morphology. The talc may have a platey particle morphology. The wollastonite may have a needle-like particle morphology. The perlite may have a 3D particle morphology (for example, a curved broken "egg-shell" like structure). The mica may have a platey and/or blocky particle morphology. The quartz may have a platey and/or blocky particle morphology. The chlorite may have a platey and/or blocky particle morphology.

The mineral blend may comprise no greater than about 25 wt. %, for example, no greater than about 20 wt. %, or no greater than about 18 wt. %, of hydrous kaolin, based on the total weight of the mineral blend. The mineral blend may comprise at least about 5 wt. %, for example, at least about 10 wt. %, of hydrous kaolin, based on the total weight of the mineral blend. The mineral blend may comprise from about 5 wt. % to about 25 wt. %, for example, from about 10 wt. % to about 20 wt. %, or from about 10 wt. % to about 18 wt. %, of hydrous kaolin, based on the total weight of the mineral blend.

The mineral blend may comprise no greater than about 30 wt. %, for example, no greater than about 25 wt. %, or no greater than about 23 wt. %, of precipitated calcium carbonate, based on the total weight of the mineral blend. The mineral blend may comprise at least about 4 wt. %, for example, at least about 5 wt. %, or at least about 6 wt. %, of precipitated calcium carbonate, based on the total weight of the mineral blend. The mineral blend may comprise from about 4 wt. % to about 30 wt. %, for example, from about 5 wt. % to about 25 wt. %, or from about 6 wt. % to about 23 wt. %, of precipitated calcium carbonate, based on the total weight of the mineral blend.

The mineral blend may comprise no greater than about 20 wt. %, for example, no greater than about 15 wt. %, or no greater than about 11 wt. %, of natural diatomaceous earth, based on the total weight of the mineral blend. The mineral blend may comprise at least about 5 wt. %, for example, at least about 10 wt. %, or at least about 11 wt. %, of natural diatomaceous earth, based on the total weight of the mineral blend. The mineral blend may comprise from about 5 wt. % to about 20 wt. %, for example, from about 10 wt. % to about 15 wt. %, or from about 10 wt. % to about 15 wt. %, of natural diatomaceous earth, based on the total weight of the mineral blend. The mineral blend may comprise about 11 wt. % natural diatomaceous earth, based on the total weight of the mineral blend.

The mineral blend may comprise no greater than about 25 wt. %, for example, no greater than about 20 wt. %, or no greater than about 19 wt. %, of flux calcined diatomaceous earth, based on the total weight of the mineral blend. The mineral blend may comprise at least about 10 wt. %, for example, at least about 15 wt. %, or at least about 18 wt. %, or at least about 19 wt. %, of flux calcined diatomaceous earth, based on the total weight of the mineral blend. The mineral blend may comprise from about 10 wt. % to about 25 wt. %, for example, from about 15 wt. % to about 20 wt. %, or from about 18 wt. % to about 20 wt. %, of flux calcined diatomaceous earth, based on the total weight of the mineral blend. The mineral blend may comprise about 19 wt. % flux calcined diatomaceous earth, based on the total weight of the mineral blend.

The mineral blend may comprise no greater than about 40 wt. %, for example, no greater than about 35 wt. %, or no greater than about 30 wt. %, or no greater than about 27 wt. %, of talc, based on the total weight of the mineral blend. The mineral blend may comprise at least about 4 wt. %, for example, at least about 5 wt. %, or at least about 6 wt. %, or at least about 8 wt. %, of talc, based on the total weight of the mineral blend. The mineral blend may comprise from about 4 wt. % to about 40 wt. %, for example, from about 5 wt. % to about 35 wt. %, or from about 6 wt. % to about 30 wt. %, or from about 8 wt. % to about 27 wt. %, of talc, based on the total weight of the mineral blend.

The mineral blend may comprise no greater than about 40 wt. %, for example, no greater than about 35 wt. %, or no greater than about 30 wt. %, or no greater than about 25 wt. %, of wollastonite, based on the total weight of the mineral blend. The mineral blend may comprise at least about 10 wt. %, for example, at least about 15 wt. %, or at least about 20 wt. %, or at least about 25 wt. %, wollastonite, based on the total weight of the mineral blend. The mineral blend may comprise from about 10 wt. % to about 40 wt. %, for example, from about 15 wt. % to about 35 wt. %, or from about 20 wt. % to about 30 wt. %, of wollastonite, based on the total weight of the mineral blend. The mineral blend may comprise about 25 wt. % wollastonite, based on the total weight of the mineral blend.

The mineral blend may comprise no greater than about 15 wt. %, for example, no greater than about 10 wt. %, or no greater than about 5 wt. %, or no greater than about 4 wt. %, of perlite, based on the total weight of the mineral blend. The mineral blend may comprise at least about 1 wt. %, for example, at least about 2 wt. %, or at least about 3 wt. %, or at least about 4 wt. %, perlite, based on the total weight of the mineral blend. The mineral blend may comprise from about 1 wt. % to about 15 wt. %, for example, from about 2 wt. % to about 10 wt. %, or from about 3 wt. % to about 5 wt. %, of perlite, based on the total weight of the mineral blend. The mineral blend may comprise about 4 wt. % perlite, based on the total weight of the mineral blend.

The mineral blend may comprise no greater than about 35 wt. %, for example, no greater than about 30 wt. %, or no greater than about 25 wt. %, of mica, based on the total weight of the mineral blend. The mineral blend may comprise at least about 5 wt. %, for example, at least about 10 wt. %, or at least about 15 wt. %, mica, based on the total weight of the mineral blend. The mineral blend may comprise from about 5 wt. % to about 35 wt. %, for example, from about 10 wt. % to about 30 wt. %, or from about 15 wt. % to about 25 wt. %, of mica, based on the total weight of the mineral blend.

The mineral blend may comprise no greater than about 35 wt. %, for example, no greater than about 30 wt. %, or no greater than about 25 wt. %, of quartz, based on the total weight of the mineral blend. The mineral blend may comprise at least about 5 wt. %, for example, at least about 10 wt. %, or at least about 15 wt. %, quartz, based on the total weight of the mineral blend. The mineral blend may comprise from about 5 wt. % to about 35 wt. %, for example, from about 10 wt. % to about 30 wt. %, or from about 15 wt. % to about 25 wt. %, of quartz, based on the total weight of the mineral blend.

The mineral blend may comprise no greater than about 45 wt. %, for example, no greater than about 40 wt. %, or no greater than about 35 wt. %, or no greater than about 30 wt. %, or no greater than about 25 wt. %, of chlorite, based on the total weight of the mineral blend. The mineral blend may comprise at least about 5 wt. %, for example, at least about 10 wt. %, or at least about 15 wt. %, chlorite, based on the total weight of the mineral blend. The mineral blend may comprise from about 5 wt. % to about 45 wt. %, for example, from about 10 wt. % to about 30 wt. %, for example from about 15 wt. % to about 25 wt. %, of chlorite, based on the total weight of the mineral blend.

The coating composition may comprise no greater than about 20 wt. %, for example, no greater than about 15 wt. %, or no greater than about 10 wt. %, or no greater than about 8.5 wt. %, of hydrous kaolin, based on the total weight of the coating composition. The coating composition may comprise at least about 1 wt. %, for example, at least about 3 wt. %, or at least about 5 wt. %, of hydrous kaolin, based on the total weight of the coating composition. The coating composition may comprise from about 1 wt. % to about 20 wt. %, for example, from about 3 wt. % to about 10 wt. %, or from about 5 wt. % to about 8.5 wt. %, of hydrous kaolin, based on the total weight of the coating composition.

The coating composition may comprise no greater than about 20 wt. %, for example, no greater than about 15 wt. %, or no greater than about 13 wt. %, or no greater than about 11 wt. %, of precipitated calcium carbonate, based on the total weight of the coating composition. The coating composition may comprise at least about 1 wt. %, for example, at least about 2 wt. %, or at least about 3 wt. %, of precipitated calcium carbonate, based on the total weight of the coating composition. The coating composition may comprise from about 1 wt. % to about 20 wt. %, for example, from about 2 wt. % to about 15 wt. %, or from about 3 wt. % to about 11 wt. %, of precipitated calcium carbonate, based on the total weight of the coating composition.

The coating composition may comprise no greater than about 10 wt. %, for example, no greater than about 5 wt. %, or no greater than about 4 wt. %, of natural diatomaceous earth, based on the total weight of the coating composition. The coating composition may comprise at least about 1 wt. %, for example, at least about 2 wt. %, or at least about 3 wt. %, or at least about 4 wt. %, of natural diatomaceous earth, based on the total weight of the coating composition. The coating composition may comprise from about 1 wt. % to about 10 wt. %, for example, from about 2 wt. % to about 5 wt. %, or from about 3 wt. % to about 5 wt. %, of natural diatomaceous earth, based on the total weight of the coating composition. The coating composition may comprise about 4 wt. % natural diatomaceous earth, based on the total weight of the coating composition.

The coating composition may comprise no greater than about 20 wt. %, for example, no greater than about 15 wt. %, or no greater than about 10 wt. %, or no greater than about 9 wt. %, of flux calcined diatomaceous earth, based on the total weight of the coating composition. The coating composition may comprise at least about 1 wt. %, for example, at least about 5 wt. %, or at least about 8 wt. %, or at least about 9 wt. %, of flux calcined diatomaceous earth, based on the total weight of the coating composition. The coating composition may comprise from about 1 wt. % to about 20 wt. %, for example, from about 5 wt. % to about 15 wt. %, or from about 8 wt. % to about 10 wt. %, of flux calcined diatomaceous earth, based on the total weight of the coating composition. The coating composition may comprise about 9 wt. % flux calcined diatomaceous earth, based on the total weight of the coating composition.

The coating composition may comprise no greater than about 20 wt. %, for example, no greater than about 15 wt. %, or no greater than about 12 wt. %, or no greater than about 11.9 wt. %, of talc, based on the total weight of the coating composition. The coating composition may comprise at least about 1 wt. %, for example, at least about 2 wt. %, or at least about 3 wt. %, or at least about 4 wt. %, of talc, based on the total weight of the coating composition. The coating composition may comprise from about 1 wt. % to about 20 wt. %, for example, from about 2 wt. % to about 15 wt. %, or from about 3 wt. % to about 12 wt. %, or from about 4 wt. % to about 11.9 wt. %, of talc, based on the total weight of the coating composition.

The coating composition may comprise no greater than about 25 wt. %, for example, no greater than about 20 wt. %, or no greater than about 15 wt. %, or no greater than about 12 wt. %, of wollastonite, based on the total weight of the coating composition. The coating composition may comprise at least about 1 wt. %, for example, at least about 5 wt. %, or at least about 8 wt. %, or at least about 10 wt. %, or at least about 12 wt. %, wollastonite, based on the total weight of the coating composition. The coating composition may comprise from about 1 wt. % to about 25 wt. %, for example, from about 5 wt. % to about 20 wt. %, or from about 10 wt. % to about 15 wt. %, of wollastonite, based on the total weight of the coating composition. The coating composition may comprise about 12 wt. % wollastonite, based on the total weight of the coating composition.

The coating composition may comprise no greater than about 15 wt. %, for example, no greater than about 10 wt. %, or no greater than about 5 wt. %, or no greater than about 3 wt. %, or no greater than about 2 wt. %, of perlite, based on the total weight of the coating composition. The coating composition may comprise at least about 0.5 wt. %, for example, at least about 1 wt. %, or at least about 1.5 wt. %, or at least about 1.8 wt. %, perlite, based on the total weight of the coating composition. The coating composition may comprise from about 0.5 wt. % to about 15 wt. %, for example, from about 0.5 wt. % to about 10 wt. %, or from about 0.5 wt. % to about 5 wt. %, or from about 1 wt. % to about 5 wt. %, or from about 1.8 wt. % to about 2 wt. %, of perlite, based on the total weight of the coating composition.

The coating composition may comprise no greater than about 20 wt. %, for example, no greater than about 15 wt. %, or no greater than about 12 wt. %, or no greater than about 10 wt. %, of mica, based on the total weight of the coating composition. The coating composition may comprise at least about 3 wt. %, for example, at least about 5 wt. %, or at least about 10 wt. %, of mica, based on the total weight of the coating composition. The coating composition may comprise from about 3 wt. % to about 20 wt. %, for example, from about 5 wt. % to about 15 wt. %, of mica, based on the total weight of the coating composition.

The coating composition may comprise no greater than about 20 wt. %, for example, no greater than about 15 wt. %, or no greater than about 12 wt. %, or no greater than about 10 wt. %, of quartz, based on the total weight of the coating composition. The coating composition may comprise at least about 3 wt. %, for example, at least about 5 wt. %, or at least about 10 wt. %, of quartz, based on the total weight of the coating composition. The coating composition may comprise from about 3 wt. % to about 20 wt. %, for example, from about 5 wt. % to about 15 wt. %, of quartz, based on the total weight of the coating composition.

The coating composition may comprise no greater than about 35 wt. %, for example, no greater than about 30 wt. %, or no greater than about 25 wt. %, or no greater than about 20 wt. %, or no greater than about 15 wt. %, or no greater than about 10 wt. %, of chlorite, based on the total weight of the coating composition. The coating composition may comprise at least about 3 wt. %, for example, at least about 5 wt. %, or at least about 10 wt. %, of chlorite, based on the total weight of the coating composition. The coating composition may comprise from about 3 wt. % to about 35 wt. %, for example, from about 5 wt. % to about 25 wt. %, or from about 5 wt. % to about 20 wt. %, or from about 5 wt. % to about 15 wt. %, of chlorite, based on the total weight of the coating composition.

Minerals in the mineral blend may be classified as opacifying, matting and/or whitening minerals, depending on their optical properties when added to a coating composition. The skilled person will recognise that some minerals have one or more of opacifying, matting and/or whitening properties and may therefore be classified as one or more of opacifying, matting and/or whitening minerals (i.e. the opacifying, matting and whitening minerals are overlapping groups). For example, precipitated calcium carbonate may be classified as an opacifying mineral and as a whitening mineral and, where present in a coating composition, precipitated calcium carbonate may serve a dual purpose as both opacifier and whitener. To account for the presence of such dual- or tri-purpose minerals, throughout this specification and the appended claims, where reference is made to a coating composition or mineral blend comprising, for example, X wt. % of opacifying minerals, the value X is determined based on the weight of all opacifying minerals in the composition or blend, including those opacifying minerals which are also matting and/or whitening minerals. Similarly, where reference is made to a coating composition or mineral blend comprising, for example, Y wt. % of matting minerals, the value Y is determined based on the weight of all matting minerals in the composition or blend, including those matting minerals which are also opacifying and/or whitening minerals, and, where reference is made to a coating composition or mineral blend comprising, for example, Z wt. % of whitening minerals, the value Z is determined based on the weight of all whitening minerals in the composition or blend, including those whitening minerals which are also opacifying and/or matting minerals. Each individual mineral in the composition or blend may therefore contribute to two or more of X, Y and Z (for example, precipitated calcium carbonate, if present, would contribute to both X and Z). Accordingly, it is possible for the total value of X+Y+Z to be equal to or greater than 100 without contradiction (i.e. without implying that the amount of any individual mineral, or the total amount of all minerals, in a coating composition or mineral blend exceeds 100 wt. %).

Hydrous kaolin may be provided as an opacifying mineral. Precipitated calcium carbonate may be provided as an opacifying mineral and/or whitening mineral. Natural diatomaceous earth may be provided as a matting mineral and/or opacifying mineral. Flux calcined diatomaceous earth may be provided as a matting mineral and/or opacifying mineral. Talc may be provided as a matting mineral and/or opacifying mineral. Wollastonite may be provided as a matting mineral. Perlite may be provided as a matting mineral. Mica may be provided as a matting mineral. Quartz may be provided as a matting mineral. Chlorite may be provided as a matting mineral and/or opacifying mineral.

The mineral blend may comprise at least one mineral (for example, or at least two minerals, or at least three minerals, or at least four minerals, or at least five minerals) from the following group: hydrous kaolin as an opacifying mineral, precipitated calcium carbonate as an opacifying mineral and/or whitening mineral, natural diatomaceous earth as a matting mineral and/or opacifying mineral, flux calcined diatomaceous earth as a matting mineral and/or opacifying mineral, talc as a matting mineral and/or opacifying mineral, wollastonite as a matting mineral, perlite as a matting mineral, mica as a matting mineral, quartz as a matting mineral, chlorite as a matting mineral and/or opacifying mineral.

It may be that the mineral blend comprises, in addition to ground calcium carbonate and calcined kaolin, at least one further matting mineral chosen from the group: perlite, wollastonite, talc, natural diatomaceous earth, flux calcined diatomaceous earth, quartz, mica, chlorite.

For example, the mineral blend may comprise in addition to ground calcium carbonate and calcined kaolin, at least one matting mineral chosen from perlite and diatomaceous earth (for example, flux calcined diatomaceous earth or natural diatomaceous earth).

For example, the mineral blend may comprise in addition to ground calcium carbonate and calcined kaolin, at least two matting minerals chosen from perlite, wollastonite, talc, natural diatomaceous earth, flux calcined diatomaceous earth, quartz, mica, chlorite.

It may be that the opacifying, matting and/or whitening properties of the various minerals are dependent on the particle size. Ground calcium carbonate having a $d_{50}$ of no greater than about 5.0 μm is typically whitening. Ground calcium carbonate having a $d_{50}$ of greater than about 5.0 μm is typically both whitening and matting. Ground calcium carbonate having a $d_{50}$ of greater than about 10.0 μm is typically matting.

The opacifying minerals present in the mineral blend may each have $d_{50}$ of at least about 0.1 μm, for example, or at least about 0.3 μm, or at least about 0.5 μm. The opacifying minerals present in the mineral blend may each have $d_{50}$ of no greater than about 20.0 μm, for example, no greater than about 15.0 μm, or no greater than about 10.0 μm, or no greater than about 5.0 μm, or no greater than about 3.0 μm. The opacifying minerals present in the mineral blend may each have $d_{50}$ from about 0.1 μm to about 20.0 μm, for example, or from about 0.1 μm to about 15.0 μm, or from about 0.1 μm to about 10.0 μm, or from about 0.3 μm to about 5.0 μm, or from about 0.5 μm to about 3.0 μm. If one of the opacifying minerals is a natural or flux calcined diatomaceous earth, the $d_{50}$ for that mineral is determined by laser light scattering.

The matting minerals present in the mineral blend may each have $d_{50}$ of at least about 1.0 μm, for example, or at least about 2.0 μm, or at least about 3.0 μm, or at least about 4.0 μm. The matting minerals present in the mineral blend may each have $d_{50}$ of no greater than about 50.0 μm, for example, or no greater than about 40.0 μm, or no greater than about 30.0 μm. The matting minerals present in the mineral blend may each have $d_{50}$ from about 1.0 μm to about 50.0 μm, for example, or from about 2.0 μm to about 40.0 μm, or from about 3.0 μm to about 30.0 μm, or from about 4.0 μm to about 30.0 μm. If one of the opacifying minerals is a natural or flux calcined diatomaceous earth, or wollastonite, or perlite, the $d_{50}$ for that mineral is determined by laser light scattering.

The whitening minerals present in the mineral blend may each have $d_{50}$ of at least about 0.5 µm, for example, or at least about 1.0 µm, or at least about 1.5 µm, or at least about 2.0 µm, or at least about 2.5 µm. The whitening minerals present in the mineral blend may each have $d_{50}$ of no greater than about 10.0 µm, for example, or no greater than about 9.0 µm or no greater than about 8.0 µm, or no greater than about 7.0 µm, or no greater than about 6.5 µm, or no greater than about 6.0 µm, or no greater than about 5.0 µm, or no greater than about 2.5 µm. The whitening minerals present in the mineral blend may each have $d_{50}$ from about 0.5 µm to about 10.0 µm, for example, or from about 1.0 µm to about 8.0 µm, or from about 2.0 µm to about 7.0 µm, or from about 2.5 µm to about 6.5 µm.

The whitening minerals present in the mineral blend typically have an ISO brightness of at least 85, for example, at least 88, or at least 90. ISO brightness may be determined in accordance with ISO 2470.

The mineral blend may comprise at least about 20 wt. %, for example, at least about 25 wt. %, or at least about 30 wt. %, or at least about 35 wt. %, or at least about 40 wt. %, or at least about 45 wt. %, of opacifying minerals, based on the total weight of the mineral blend. The mineral blend may comprise no greater than about 70 wt. %, for example, no greater than about 65 wt. %, or no greater than about 60 wt. %, of opacifying minerals, based on the total weight of the mineral blend. The mineral blend may comprise from about 20 wt. % to about 70 wt. %, for example, from about 35 wt. % to about 65 wt. %, for example from about 45 wt. % to about 60 wt. %, of opacifying minerals, based on the total weight of the mineral blend.

The mineral blend may comprise at least about 5 wt. %, for example, at least about 10 wt. %, or at least about 15 wt. %, of matting minerals, based on the total weight of the mineral blend. The mineral blend may comprise no greater than about 55 wt. %, for example, no greater than about 50 wt. %, or no greater than about 45 wt. %, or no greater than about 40 wt. %, of matting minerals, based on the total weight of the mineral blend. The mineral blend may comprise from about 5 wt. % to about 50 wt. %, for example, from about 10 wt. % to about 45 wt. %, for example from about 15 wt. % to about 40 wt. %, of matting minerals, based on the total weight of the mineral blend.

The mineral blend may comprise at least about 5 wt. %, for example, at least about 12 wt. %, or at least about 15 wt. %, of whitening minerals, based on the total weight of the mineral blend. The mineral blend may comprise no greater than about 65 wt. %, for example, no greater than about 55 wt. %, or no greater than about 45 wt. %, or no greater than about 40 wt. %, or no greater than about 35 wt. %, of whitening minerals, based on the total weight of the mineral blend. The mineral blend may comprise from about 5 wt. % to about 55 wt. %, for example, from about 10 wt. % to about 45 wt. %, for example from about 10 wt. % to about 35 wt. %, of whitening minerals, based on the total weight of the mineral blend.

Accordingly, the coating composition may comprise at least one mineral (for example one mineral, or two minerals, or three minerals, or four minerals, or five minerals) from the following group: hydrous kaolin as an opacifying mineral, precipitated calcium carbonate as an opacifying mineral and/or whitening mineral, natural diatomaceous earth as a matting mineral and/or opacifying mineral, flux calcined diatomaceous earth as a matting mineral and/or opacifying mineral, talc as a matting mineral and/or opacifying mineral, wollastonite as a matting mineral, perlite as a matting mineral, mica as a matting mineral, quartz as a matting mineral, chlorite as a matting mineral and/or opacifying mineral.

The coating composition may comprise at least about 5 wt. %, for example, at least about 10 wt. %, or at least about 15 wt. %, of opacifying minerals, based on the total weight of the coating composition. The coating composition may comprise no greater than about 45 wt. %, for example, no greater than about 40 wt. %, or no greater than about 35 wt. %, or no greater than about 30 wt. %, of opacifying minerals, based on the total weight of the coating composition. The coating composition may comprise from about 5 wt. % to about 45 wt. %, for example, from about 10 wt. % to about 40 wt. %, or from about 10 wt. % to about 35 wt. %, or from about 15 wt. % to about 30 wt. %, of opacifying minerals, based on the total weight of the coating composition.

The coating composition may comprise at least about 1 wt. %, for example, at least about 3 wt. %, or at least about 5 wt. %, or at least about 8 wt. %, of matting minerals, based on the total weight of the coating composition. The coating composition may comprise no greater than about 40 wt. %, for example, no greater than about 35 wt. %, or no greater than about 30 wt. %, or no greater than about 25 wt. %, or no greater than about 20 wt. %, of matting minerals, based on the total weight of the coating composition. The coating composition may comprise from about 1 wt. % to about 40 wt. %, for example, from about 3 wt. % to about 35 wt. %, or from about 5 wt. % to about 30 wt. %, or from about 5 wt. % to about 25 wt. %, or from about 8 wt. % to about 20 wt. %, of matting minerals, based on the total weight of the coating composition.

The coating composition may comprise at least about 1 wt. %, for example, at least about 2 wt. %, or at least about 3 wt. %, or at least about 4 wt. %, or at least about 5 wt. %, of whitening minerals, based on the total weight of the coating composition. The coating composition may comprise no greater than about 40 wt. %, for example, no greater than about 35 wt. %, or no greater than about 30 wt. %, or no greater than about 25 wt. %, or no greater than about 20 wt. %, of whitening minerals, based on the total weight of the coating composition. The coating composition may comprise from about 1 wt. % to about 40 wt. %, for example, from about 3 wt. % to about 30 wt. %, or from about 3 wt. % to about 25 wt. %, or from about 5 wt. % to about 20 wt. %, of whitening minerals, based on the total weight of the coating composition.

The mineral blend may comprise (e.g., consist of), based on the total weight of the mineral blend: from about 10 wt. % to about 30 wt. %, for example, from about 15 wt. % to about 25 wt. %, or from about 20 wt. % to about 25 wt. %, ground calcium carbonate (e.g., having a $d_{50}$ of from about 3.0 µm to about 6.0 µm); from about 1 wt. % to about 10 wt. %, for example, from about 2 wt. % to about 6 wt. %, of perlite; from about 15 wt. % to about 40 wt. %, for example, from about 20 wt. % to about 35 wt. %, of talc; from about 15 wt. % to about 40 wt. %, for example, from about 20 wt. % to about 35 wt. %, of calcined kaolin (e.g., having a $d_{50}$ of from about 0.5 µm to about 1.5 µm); and from about 10 wt. % to about 30 wt. %, for example, from about 15 wt. % to about 25 wt. %, of hydrous kaolin; wherein the amount of each said mineral in the mineral blend is selected so that the sum of the weight percentages of the said minerals is 100.

The mineral blend may comprise (e.g., consist of), based on the total weight of the mineral blend: from about 10 wt. % to about 30 wt. %, for example, from about 15 wt. % to about 25 wt. %, or from about 20 wt. % to about 25 wt. %, of ground calcium carbonate (e.g., having a $d_{50}$ of from about 3.0 µm to about 6.0 µm); from about 1 wt. % to about 10 wt. %, for example, from about 2 wt. % to about 6 wt. %, of perlite; from about 15 wt. % to about 35 wt. %, for example, from about 20 wt. % to about 30 wt. %, of wollastonite; from about 15 wt. % to about 40 wt. %, for example, from about 20 wt. % to about 35 wt. %, of calcined kaolin (e.g., having a $d_{50}$ of from about 0.5 µm to about 1.5 µm); from about 1 wt. % to about 15 wt. %, for example, from about 2 wt. % to about 10 wt. %, of precipitated calcium carbonate; and from about 5 wt. % to about 25 wt. %, for example, from about 10 wt. % to about 20 wt. %, of hydrous kaolin; wherein the amount of each said mineral in the mineral blend is selected so that the sum of the weight percentages of the said minerals is 100.

The mineral blend may comprise (e.g., consist of), based on the total weight of the mineral blend: from about 10 wt. % to about 50 wt. %, for example, from about 20 wt. % to about 40 wt. %, of ground calcium carbonate (e.g., from about 10 wt. % to about 30 wt. %, for example, from about 15 wt. % to about 25 wt. %, of ground calcium carbonate having a $d_{50}$ of from about 3.0 µm to about 6.0 µm and from about 1 wt. % to about 15 wt. %, for example, from about 5 wt. % to about 10 wt. %, of ground calcium carbonate having a $d_{50}$ of from about 5.0 µm to about 15.0 µm); from about 1 wt. % to about 10 wt. %, for example, from about 2 wt. % to about 6 wt. %, of perlite; from about 1 wt. % to about 15 wt. %, for example, from about 5 wt. % to about 10 wt. %, of talc; from about 10 wt. % to about 35 wt. %, for example, from about 20 wt. % to about 25 wt. %, of calcined kaolin (e.g., having a $d_{50}$ of from about 0.5 µm to about 1.5 µm); from about 1 wt. % to about 12 wt. %, for example, from about 4 wt. % to about 8 wt. %, of precipitated calcium carbonate; and from about 5 wt. % to about 25 wt. %, for example, from about 10 wt. % to about 20 wt. %, of hydrous kaolin; wherein the amount of each said mineral in the mineral blend is selected so that the sum of the weight percentages of the said minerals is 100.

The mineral blend may comprise (e.g., consist of), based on the total weight of the mineral blend: from about 10 wt. % to about 50 wt. %, for example, from about 20 wt. % to about 40 wt. %, or from about 25 wt. % to about 35 wt. %, of ground calcium carbonate (e.g., having a $d_{50}$ of from about 4.0 µm to about 9.0 µm); from about 1 wt. % to about 10 wt. %, for example, from about 2 wt. % to about 6 wt. %, of perlite; from about 5 wt. % to about 30 wt. %, for example, from about 10 wt. % to about 25 wt. %, of talc; and from about 30 wt. % to about 70 wt. %, for example, from about 40 wt. % to about 60 wt. %, of calcined kaolin (e.g., having a $d_{50}$ of from about 0.5 µm to about 1.5 µm); wherein the amount of each said mineral in the mineral blend is selected so that the sum of the weight percentages of the said minerals is 100.

The mineral blend may comprise (e.g., consist of), based on the total weight of the mineral blend: from about 10 wt. % to about 50 wt. %, for example, from about 20 wt. % to about 40 wt. %, of ground calcium carbonate (e.g., from about 10 wt. % to about 30 wt. %, for example, from about 15 wt. % to about 25 wt. %, of ground calcium carbonate having a $d_{50}$ of from about 3.0 µm to about 6.0 µm and from about 1 wt. % to about 15 wt. %, for example, from about 5 wt. % to about 10 wt. %, of ground calcium carbonate having a $d_{50}$ of from about 5.0 µm to about 15.0 µm); from about 1 wt. % to about 10 wt. %, for example, from about 2 wt. % to about 6 wt. %, of perlite; from about 1 wt. % to about 15 wt. %, for example, from about 4 wt. % to about 10 wt. %, of talc; from about 10 wt. % to about 35 wt. %, for example, from about 15 wt. % to about 30 wt. %, of calcined kaolin, for example flash calcined kaolin (e.g., having a $d_{50}$ of from about 1.0 µm to about 2.0 µm); from about 10 wt. % to about 35 wt. %, for example, from about 15 wt. % to about 30 wt. %, of precipitated calcium carbonate; and from about 5 wt. % to about 25 wt. %, for example, from about 10 wt. % to about 20 wt. %, of hydrous kaolin; wherein the amount of each said mineral in the mineral blend is selected so that the sum of the weight percentages of the said minerals is 100.

The mineral blend may comprise (e.g., consist of), based on the total weight of the mineral blend: from about 10 wt. % to about 50 wt. %, for example, from about 20 wt. % to about 40 wt. %, or from about 25 wt. % to about 35 wt. %, of ground calcium carbonate (e.g., having a $d_{50}$ of from about 1.0 µm to about 3.5 µm); from about 10 wt. % to about 30 wt. %, for example, from about 15 wt. % to about 25 wt. %, of flux calcined diatomaceous earth; and from about 20 wt. % to about 70 wt. %, for example, from about 30 wt. % to about 60 wt. %, or from about 40 wt. % to about 60 wt. %, of calcined kaolin (e.g., having a $d_{50}$ of from about 0.5 µm to about 1.5 µm); wherein the amount of each said mineral in the mineral blend is selected so that the sum of the weight percentages of the said minerals is 100.

The mineral blend may comprise (e.g. consist of), based on the total weight of the mineral blend: from about 5 wt. % to about 25 wt. %, for example, from about 10 wt. % to about 20 wt. %, of ground calcium carbonate (e.g., having a $d_{50}$ of from about 1.0 µm to about 3.5 µm); from about 10 wt. % to about 50 wt. %, for example, from about 20 wt. % to about 40 wt. %, of one or more of mica, quartz, and chlorite, or a mixture thereof (for example, the mineral coalescence leucophyllite); from about 5 wt. % to about 20 wt. %, for example, from about 8 wt. % to about 15 wt. %, of natural diatomaceous earth; and from about 30 wt. % to about 60 wt. %, for example, from about 40 wt. % to about 50 wt. %, of calcined kaolin (e.g., having a $d_{50}$ of from about 0.3 µm to about 1.1 µm); wherein the amount of each said mineral in the mineral blend is selected so that the sum of the weight percentages of the said minerals is 100.

The coating composition may comprise, based on the total weight of the coating composition: from about 1 wt. % to about 20 wt. %, for example, from about 5 wt. % to about 15 wt. %, or from about 8 wt. % to about 14 wt. %, ground calcium carbonate (e.g., having a $d_{50}$ of from about 3.0 µm to about 6.0 µm); from about 0.5 wt. % to about 5 wt. %, for example, from about 1 wt. % to about 3 wt. %, of perlite; from about 5 wt. % to about 20 wt. %, for example, from about 10 wt. % to about 15 wt. %, of talc; from about 5 wt. % to about 20 wt. %, for example, from about 10 wt. % to about 15 wt. %, of calcined kaolin (e.g., having a $d_{50}$ of from about 0.5 µm to about 1.5 µm); and from about 5 wt. % to about 15 wt. %, for example, from about 6 wt. % to about 10 wt. %, of hydrous kaolin. The amount of each said mineral in the coating composition is typically selected so that the sum of the weight percentages of the said minerals in the coating composition is less than 100.

The coating composition may comprise, based on the total weight of the coating composition: from about 1 wt. % to about 20 wt. %, for example, from about 5 wt. % to about 15 wt. %, or from about 8 wt. % to about 14 wt. %, ground calcium carbonate (e.g., having a $d_{50}$ of from about 3.0 µm to about 6.0 µm); from about 0.5 wt. % to about 5 wt. %, for example, from about 1 wt. % to about 3 wt. %, of perlite; from about 5 wt. % to about 20 wt. %, for example, from about 10 wt. % to about 15 wt. %, of talc; from about 5 wt.

% to about 20 wt. %, for example, from about 10 wt. % to about 15 wt. %, of calcined kaolin (e.g., having a $d_{50}$ of from about 0.5 μm to about 1.5 μm); and from about 5 wt. % to about 15 wt. %, for example, from about 6 wt. % to about 10 wt. %, of hydrous kaolin. The amount of each said mineral in the coating composition is typically selected so that the sum of the weight percentages of the said minerals in the coating composition is less than 100.

The coating composition may comprise, based on the total weight of the coating composition: from about 1 wt. % to about 20 wt. %, for example, from about 5 wt. % to about 15 wt. %, or from about 8 wt. % to about 14 wt. %, of ground calcium carbonate (e.g., having a $d_{50}$ of from about 3.0 μm to about 6.0 μm); from about 0.5 wt. % to about 5 wt. %, for example, from about 1 wt. % to about 3 wt. %, of perlite; from about 5 wt. % to about 20 wt. %, for example, from about 10 wt. % to about 15 wt. %, of wollastonite; from about 5 wt. % to about 20 wt. %, for example, from about 10 wt. % to about 15 wt. %, of calcined kaolin (e.g., having a $d_{50}$ of from about 0.5 μm to about 1.5 μm); from about 0.5 wt. % to about 10 wt. %, for example, from about 1 wt. % to about 5 wt. %, of precipitated calcium carbonate; and from about 1 wt. % to about 15 wt. %, for example, from about 5 wt. % to about 10 wt. %, of hydrous kaolin. The amount of each said mineral in the coating composition is typically selected so that the sum of the weight percentages of the said minerals in the coating composition is less than 100.

The coating composition may comprise, based on the total weight of the coating composition: from about 5 wt. % to about 30 wt. %, for example, from about 10 wt. % to about 20 wt. %, of ground calcium carbonate (e.g., from about 5 wt. % to about 20 wt. %, for example, from about 8 wt. % to about 15 wt. %, of ground calcium carbonate having a $d_{50}$ of from about 3.0 μm to about 6.0 μm and from about 1 wt. % to about 8 wt. %, for example, from about 2 wt. % to about 6 wt. %, of ground calcium carbonate having a $d_{50}$ of from about 5.0 μm to about 15.0 μm); from about 0.5 wt. % to about 5 wt. %, for example, from about 1 wt. % to about 3 wt. %, of perlite; from about 1 wt. % to about 8 wt. %, for example, from about 2 wt. % to about 6 wt. %, of talc; from about 5 wt. % to about 20 wt. %, for example, from about 8 wt. % to about 15 wt. %, of calcined kaolin (e.g., having a $d_{50}$ of from about 0.5 μm to about 1.5 μm); from about 5 wt. % to about 20 wt. %, for example, from about 8 wt. % to about 15 wt. %, of precipitated calcium carbonate; and from about 1 wt. % to about 10 wt. %, for example, from about 3 wt. % to about 7 wt. %, of hydrous kaolin. The amount of each said mineral in the coating composition is typically selected so that the sum of the weight percentages of the said minerals in the coating composition is less than 100.

The coating composition may comprise, based on the total weight of the coating composition: from about 5 wt. % to about 25 wt. %, for example, from about 8 wt. % to about 20 wt. %, or from about 10 wt. % to about 18 wt. %, of ground calcium carbonate (e.g., having a $d_{50}$ of from about 4.0 μm to about 9.0 μm); from about 0.5 wt. % to about 5 wt. %, for example, from about 1 wt. % to about 3 wt. %, of perlite; from about 2 wt. % to about 15 wt. %, for example, from about 5 wt. % to about 12 wt. %, of talc; and from about 10 wt. % to about 35 wt. %, for example, from about 18 wt. % to about 30 wt. %, of calcined kaolin (e.g., having a $d_{50}$ of from about 0.5 μm to about 1.5 μm). The amount of each said mineral in the coating composition is typically selected so that the sum of the weight percentages of the said minerals in the coating composition is less than 100.

The coating composition may comprise, based on the total weight of the coating composition: from about 5 wt. % to about 30 wt. %, for example, from about 10 wt. % to about 20 wt. %, of ground calcium carbonate (e.g., from about 5 wt. % to about 20 wt. %, for example, from about 8 wt. % to about 15 wt. %, of ground calcium carbonate having a $d_{50}$ of from about 3.0 μm to about 6.0 μm and from about 1 wt. % to about 8 wt. %, for example, from about 2 wt. % to about 6 wt. %, of ground calcium carbonate having a $d_{50}$ of from about 5.0 μm to about 15.0 μm); from about 0.5 wt. % to about 5 wt. %, for example, from about 1 wt. % to about 3 wt. %, of perlite; from about 1 wt. % to about 8 wt. %, for example, from about 2 wt. % to about 6 wt. %, of talc; from about 5 wt. % to about 20 wt. %, for example, from about 8 wt. % to about 15 wt. %, of calcined kaolin, for example flash calcined kaolin (e.g., having a $d_{50}$ of from about 1.0 μm to about 2.0 μm); from about 5 wt. % to about 20 wt. %, for example, from about 8 wt. % to about 15 wt. %, of precipitated calcium carbonate; and from about 1 wt. % to about 10 wt. %, for example, from about 3 wt. % to about 7 wt. %, of hydrous kaolin. The amount of each said mineral in the coating composition is typically selected so that the sum of the weight percentages of the said minerals in the coating composition is less than 100.

The coating composition may comprise, based on the total weight of the coating composition: from about 5 wt. % to about 30 wt. %, for example, from about 10 wt. % to about 20 wt. %, or from about 12 wt. % to about 18 wt. %, of ground calcium carbonate (e.g., having a $d_{50}$ of from about 1.0 μm to about 3.5 μm); from about 4 wt. % to about 15 wt. %, for example, from about 6 wt. % to about 12 wt. %, of flux calcined diatomaceous earth; and from about 10 wt. % to about 35 wt. %, for example, from about 15 wt. % to about 30 wt. %, or from about 20 wt. % to about 30 wt. %, of calcined kaolin (e.g., having a $d_{50}$ of from about 0.5 μm to about 1.5 μm). The amount of each said mineral in the coating composition is typically selected so that the sum of the weight percentages of the said minerals in the coating composition is less than 100.

The coating composition may comprise, based on the total weight of the coating composition: from about 1 wt. % to about 10 wt. %, for example, from about 3 wt. % to about 7 wt. %, of ground calcium carbonate (e.g., having a $d_{50}$ of from about 1.0 μm to about 3.5 μm); from about 5 wt. % to about 15 wt. %, for example, from about 8 wt. % to about 12 wt. %, of one or more of mica, quartz, and chlorite, or a mixture thereof (for example, the mineral coalescence leucophyllite); from about 1 wt. % to about 10 wt. %, for example, from about 2 wt. % to about 6 wt. %, of natural diatomaceous earth; and from about 5 wt. % to about 30 wt. %, for example, from about 10 wt. % to about 20 wt. %, of calcined kaolin (e.g., having a $d_{50}$ of from about 0.3 μm to about 1.1 μm). The amount of each said mineral in the coating composition is typically selected so that the sum of the weight percentages of the said minerals in the coating composition is less than 100.

Coating Composition Properties

The coating composition, for example paint, may have an opacity of at least about 95.0%, for example, or at least about 96.0%, or at least about 97.0%, or at least about 97.5%, or at least about 98.0%, at 8 $m^2$/L according to ISO 6504-3.

The coating composition, for example paint, may have an opacity of at least about 95.0%, for example, or at least about 96.0%, or at least about 97.0%, or at least about 97.5%, at 8 $m^2$/L according to ISO 6504/1.

The coating composition, for example paint, may have 85° gloss, at 100 μm wet film thickness, of no greater than about 7.0, or no greater than about 6.0, or no greater than about 5.5, or no greater than about 5.0, or no greater than about 4.5, or no greater than about 4.0, or no greater than about 3.5, or no greater than about 3.0, measured according to ISO 2813.

The coating composition, for example paint, may have 85° gloss, at 100 μm wet film thickness, of no greater than about 7.0, or no greater than about 6.0, or no greater than about 5.5, or no greater than about 5.0, or no greater than about 4.5, or no greater than about 4.0, or no greater than about 3.5, or no greater than about 3.0, measured according to ISO 2813, for example, at a PVC of at least about 60%, or at a PVC of at least about 65%, or at a PVC of at least about 70%, or at a PVC of at least about 75%.

The coating composition, for example paint, may have 85° gloss, at 100 μm wet film thickness, of no greater than about 7.0, or no greater than about 6.0, or no greater than about 5.5, or no greater than about 5.0, or no greater than about 4.5, or no greater than about 4.0, or no greater than about 3.5, or no greater than about 3.0, measured according to ISO 2813, for example, at a PVC of no greater than about 95%, or no greater than about 90%, or no greater than about 85%, or no greater than about 80%.

The coating composition, for example paint, may have an L*, at 1500 μm wet film thickness, of at least about 90.0, for example, at least about 91.0, or at least about 92.0, or at least about 93.0, or at least about 94.0, or at least about 95.0, or at least about 96.0.

The coating composition, for example paint, may have a b*, at 1500 μm wet film thickness, of no greater than about 5.0, for example, no greater than about 4.0, or no greater than about 3.0, or no greater than about 2.9. In certain embodiments, the coating composition, for example, paint, has a b* of at least about 0.5, for example, at least about 1.0, or at least about 1.5, or at least about 2.0.

L* and b* are the colour component values on the CIE L*a*b* colour space scale. L* is a measure of whiteness. b* is a measure of yellowness. L* and b* can be measured using a Datacolour model 600 spectrophotometer.

The coating composition, for example paint, may have a scrub resistance in Class 1 according to ISO 11998. Alternatively, the coating composition, for example paint, may have a scrub resistance in Class 2 according to ISO 11998. A coating composition having a scrub resistance in Class 1 according to ISO 11998 typically has a scrub resistance of less than 5 μm at 200 cycles. A coating composition having a scrub resistance in Class 2 according to ISO 11998 typically has a scrub resistance from 5 μm to 20 μm at 200 cycles. The coating composition, for example paint, may have a scrub resistance in Type A according to BS 3900. The coating composition, for example paint, may have a scrub resistance in Type B according to BS 3900. A coating composition having a scrub resistance in Type A according to BS 3900 typically has a scrub resistance of no greater than 5 mg/cm$^2$ at 200 cycles. A coating composition having a scrub resistance in Type B according to BS 3900 typically has a scrub resistance which is greater than 5 mg/cm$^2$ at 200 cycles.

In certain embodiments, the coating composition is a paint having: an opacity of at least about 95.0%, for example at least about 97.0%, at 8 m$^2$/L according to ISO 6504-3; and 85° gloss, at 100 μm wet film thickness, of no greater than about 7.0, measured according to ISO 2813, for example, at a PVC of at least about 60%; and optionally L* of at least about 95.0, at 1500 μm wet film thickness, and/or a scrub resistance in Class 1 or Class 2 according to ISO 11998 or in Type A or B according to BS 3900.

In certain embodiments, the coating composition comprises, based on the total weight of the coating composition: from about 1 wt. % to about 20 wt. %, for example, from about 5 wt. % to about 15 wt. %, or from about 8 wt. % to about 14 wt. %, ground calcium carbonate (e.g., having a d$_{50}$ of from about 3.0 μm to about 6.0 μm); from about 0.5 wt. % to about 5 wt. %, for example, from about 1 wt. % to about 3 wt. %, of perlite; from about 5 wt. % to about 20 wt. %, for example, from about 10 wt. % to about 15 wt. %, of talc; from about 5 wt. % to about 20 wt. %, for example, from about 10 wt. % to about 15 wt. %, of calcined kaolin (e.g., having a d$_{50}$ of from about 0.5 μm to about 1.5 μm); and from about 5 wt. % to about 15 wt. %, for example, from about 6 wt. % to about 10 wt. %, of hydrous kaolin; and has: an opacity of at least about 95.0%, for example, at least about 97.0%, or at least about 98.0%, at 8 m$^2$/L according to ISO 6504-3; and 85° gloss at 100 μm wet film thickness of no greater than about 7.0, for example, no greater than about 6.0, or no greater than about 5.0, measured according to ISO 2813, for example, at a PVC of at least about 60%; and optionally L* of at least about 95.0, for example, at least about 96.0, at 1500 μm wet film thickness and/or a scrub resistance in Class 1 or Class 2 according to ISO 11998 or in Type A or B according to BS 3900.

In certain embodiments, the coating composition comprises, based on the total weight of the coating composition: from about 1 wt. % to about 20 wt. %, for example, from about 5 wt. % to about 15 wt. %, or from about 8 wt. % to about 14 wt. %, ground calcium carbonate (e.g., having a d$_{50}$ of from about 3.0 μm to about 6.0 μm); from about 0.5 wt. % to about 5 wt. %, for example, from about 1 wt. % to about 3 wt. %, of perlite; from about 5 wt. % to about 20 wt. %, for example, from about 10 wt. % to about 15 wt. %, of talc; from about 5 wt. % to about 20 wt. %, for example, from about 10 wt. % to about 15 wt. %, of calcined kaolin (e.g., having a d$_{50}$ of from about 0.5 μm to about 1.5 μm); and from about 5 wt. % to about 15 wt. %, for example, from about 6 wt. % to about 10 wt. %, of hydrous kaolin; and has: an opacity of at least about 95.0%, for example, at least about 97.0%, or at least about 98.0%, at 8 m$^2$/L according to ISO 6504-3; and 85° gloss at 100 μm wet film thickness of no greater than about 7.0, for example, no greater than about 6.0, or no greater than about 5.0, measured according to ISO 2813, for example, at a PVC of at least about 60%; and optionally L* of at least about 95.0, for example, at least about 96.0, at 1500 μm wet film thickness and/or a scrub resistance in Class 1 or Class 2 according to ISO 11998 or in Type A or B according to BS 3900.

In certain embodiments, the coating composition comprises, based on the total weight of the coating composition: from about 1 wt. % to about 20 wt. %, for example, from about 5 wt. % to about 15 wt. %, or from about 8 wt. % to about 14 wt. %, of ground calcium carbonate (e.g., having a d$_{50}$ of from about 3.0 μm to about 6.0 μm); from about 0.5 wt. % to about 5 wt. %, for example, from about 1 wt. % to about 3 wt. %, of perlite; from about 5 wt. % to about 20 wt. %, for example, from about 10 wt. % to about 15 wt. %, of wollastonite; from about 5 wt. % to about 20 wt. %, for example, from about 10 wt. % to about 15 wt. %, of calcined kaolin (e.g., having a d$_{50}$ of from about 0.5 μm to about 1.5 μm); from about 0.5 wt. % to about 10 wt. %, for example, from about 1 wt. % to about 5 wt. %, of precipitated calcium carbonate; and from about 1 wt. % to about 15 wt. %, for example, from about 5 wt. % to about 10 wt. %, of hydrous kaolin; and has: an opacity of at least about 95.0%, for example, at least about 97.0%, or at least about 98.0%, at 8 m$^2$/L according to ISO 6504-3; and 85° gloss at 100 μm wet film thickness of no greater than about 7.0, for example, no greater than about 6.0, or no greater than about 5.0, measured according to ISO 2813, for example, at a PVC of at least about 60%; and optionally L* of at least about 95.0, for example, at least about 96.0, at 1500 µm wet film thickness and/or a scrub resistance in Class 1 or Class 2 according to ISO 11998 or in Type A or B according to BS 3900.

In certain embodiments, the coating composition comprises, based on the total weight of the coating composition: from about 5 wt. % to about 30 wt. %, for example, from about 10 wt. % to about 20 wt. %, of ground calcium carbonate (e.g., from about 5 wt. % to about 20 wt. %, for example, from about 8 wt. % to about 15 wt. %, of ground calcium carbonate having a $d_{50}$ of from about 3.0 µm to about 6.0 µm and from about 1 wt. % to about 8 wt. %, for example, from about 2 wt. % to about 6 wt. %, of ground calcium carbonate having a $d_{50}$ of from about 5.0 µm to about 15.0 µm); from about 0.5 wt. % to about 5 wt. %, for example, from about 1 wt. % to about 3 wt. %, of perlite; from about 1 wt. % to about 8 wt. %, for example, from about 2 wt. % to about 6 wt. %, of talc; from about 5 wt. % to about 20 wt. %, for example, from about 8 wt. % to about 15 wt. %, of calcined kaolin (e.g., having a $d_{50}$ of from about 0.5 µm to about 1.5 µm); from about 5 wt. % to about 20 wt. %, for example, from about 8 wt. % to about 15 wt. %, of precipitated calcium carbonate; and from about 1 wt. % to about 10 wt. %, for example, from about 3 wt. % to about 7 wt. %, of hydrous kaolin; and has: an opacity of at least about 95.0%, for example, at least about 97.0%, or at least about 98.0%, at 8 $m^2$/L according to ISO 6504-3; and 85° gloss at 100 µm wet film thickness of no greater than about 7.0, for example, no greater than about 6.0, or no greater than about 5.0, measured according to ISO 2813, for example, at a PVC of at least about 60%; and optionally L* of at least about 95.0, for example, at least about 96.0, at 1500 µm wet film thickness and/or a scrub resistance in Class 1 or Class 2 according to ISO 11998 or Type A or B according to BS 3900.

In certain embodiments, the coating composition comprises, based on the total weight of the coating composition: from about 5 wt. % to about 25 wt. %, for example, from about 8 wt. % to about 20 wt. %, or from about 10 wt. % to about 18 wt. %, of ground calcium carbonate (e.g., having a $d_{50}$ of from about 4.0 µm to about 9.0 µm); from about 0.5 wt. % to about 5 wt. %, for example, from about 1 wt. % to about 3 wt. %, of perlite; from about 2 wt. % to about 15 wt. %, for example, from about 5 wt. % to about 12 wt. %, of talc; and from about 10 wt. % to about 35 wt. %, for example, from about 18 wt. % to about 30 wt. %, of calcined kaolin (e.g., having a $d_{50}$ of from about 0.5 µm to about 1.5 µm); and has: an opacity of at least about 95.0%, for example, at least about 97.0%, or at least about 98.0%, at 8 $m^2$/L according to ISO 6504-3; and 85° gloss at 100 µm wet film thickness of no greater than about 7.0, for example, no greater than about 6.0, or no greater than about 5.0, measured according to ISO 2813, for example, at a PVC of at least about 60%; and optionally L* of at least about 95.0, for example, at least about 96.0, at 1500 µm wet film thickness and/or a scrub resistance in Class 1 or Class 2 according to ISO 11998 or Type A or B according to BS 3900.

In certain embodiments, the coating composition comprises, based on the total weight of the coating composition: from about 5 wt. % to about 30 wt. %, for example, from about 10 wt. % to about 20 wt. %, of ground calcium carbonate (e.g., from about 5 wt. % to about 20 wt. %, for example, from about 8 wt. % to about 15 wt. %, of ground calcium carbonate having a $d_{50}$ of from about 3.0 µm to about 6.0 µm and from about 1 wt. % to about 8 wt. %, for example, from about 2 wt. % to about 6 wt. %, of ground calcium carbonate having a $d_{50}$ of from about 5.0 µm to about 15.0 µm); from about 0.5 wt. % to about 5 wt. %, for example, from about 1 wt. % to about 3 wt. %, of perlite; from about 1 wt. % to about 8 wt. %, for example, from about 2 wt. % to about 6 wt. %, of talc; from about 5 wt. % to about 20 wt. %, for example, from about 8 wt. % to about 15 wt. %, of calcined kaolin, for example flash calcined kaolin (e.g., having a $d_{50}$ of from about 1.0 µm to about 2.0 µm); from about 5 wt. % to about 20 wt. %, for example, from about 8 wt. % to about 15 wt. %, of precipitated calcium carbonate; and from about 1 wt. % to about 10 wt. %, for example, from about 3 wt. % to about 7 wt. %, of hydrous kaolin; and has: an opacity of at least about 95.0%, for example, at least about 97.0%, or at least about 98.0%, at 8 $m^2$/L according to ISO 6504-3; and 85° gloss at 100 µm wet film thickness of no greater than about 7.0, for example, no greater than about 6.0, or no greater than about 5.0, measured according to ISO 2813, for example, at a PVC of at least about 60%; and optionally L* of at least about 95.0, for example, at least about 96.0, at 1500 µm wet film thickness and/or a scrub resistance in Class 1 or Class 2 according to ISO 11998 or Type A or B according to BS 3900.

In certain embodiments, the coating composition comprises, based on the total weight of the coating composition: from about 5 wt. % to about 30 wt. %, for example, from about 10 wt. % to about 20 wt. %, or from about 12 wt. % to about 18 wt. %, of ground calcium carbonate (e.g., having a $d_{50}$ of from about 1.0 µm to about 3.5 µm); from about 4 wt. % to about 15 wt. %, for example, from about 6 wt. % to about 12 wt. %, of flux calcined diatomaceous earth; and from about 10 wt. % to about 35 wt. %, for example, from about 15 wt. % to about 30 wt. %, or from about 20 wt. % to about 30 wt. %, of calcined kaolin (e.g., having a $d_{50}$ of from about 0.5 µm to about 1.5 µm); and has: an opacity of at least about 95.0%, for example, at least about 97.0%, or at least about 98.0%, at 8 $m^2$/L according to ISO 6504-3; and 85° gloss at 100 µm wet film thickness of no greater than about 7.0, for example, no greater than about 6.0, or no greater than about 5.0, measured according to ISO 2813, for example, at a PVC of at least about 60%; and optionally L* of at least about 95.0, for example, at least about 96.0, at 1500 µm wet film thickness and/or a scrub resistance in Class 1 or Class 2 according to ISO 11998 or in Type A or B according to BS 3900.

In certain embodiments, the coating composition comprises, based on the total weight of the coating composition: from about 1 wt. % to about 10 wt. %, for example, from about 3 wt. % to about 7 wt. %, of ground calcium carbonate (e.g., having a $d_{50}$ of from about 1.0 µm to about 3.5 µm); from about 5 wt. % to about 15 wt. %, for example, from about 8 wt. % to about 12 wt. %, of one or more of mica, quartz, and chlorite, or a mixture thereof (for example, the mineral coalescence leucophyllite); from about 1 wt. % to about 10 wt. %, for example, from about 2 wt. % to about 6 wt. %, of natural diatomaceous earth; and from about 5 wt. % to about 30 wt. %, for example, from about 10 wt. % to about 20 wt. %, of calcined kaolin (e.g., having a $d_{50}$ of from about 0.3 µm to about 1.1 µm); and has: an opacity of at least about 95.0%, for example, at least about 97.0%, or at least about 98.0%, at 8 $m^2$/L according to ISO 6504-3; and 85° gloss at 100 µm wet film thickness of no greater than about 7.0, for example, no greater than about 6.0, or no greater than about 5.0, measured according to ISO 2813, for example, at a PVC of at least about 60%; and optionally L* of at least about 95.0, for example, at least about 96.0, at 1500 μm wet film thickness and/or a scrub resistance in Class 1 or Class 2 according to ISO 11998 or Type A or B according to BS 3900.

Method of Preparation

The minerals in the mineral blend may be prepared using techniques well known to a person of skill in the art, for example, techniques selected from comminution (e.g., crushing, grinding, milling), classification (e.g., hydrodynamic selection, screening and/or sieving) and drying. Ground calcium carbonate is obtained from a natural source of calcium carbonate by grinding, which may be followed by a particle size classification step, in order to obtain a product having a desired particle size distribution. Kaolin may be obtained in the same way and subsequently calcined. The minerals may be ground autogenously, i.e. by attrition between the particles of the mineral themselves, or, alternatively, in the presence of a particulate grinding medium comprising particles of a different material from the mineral particulate to be ground.

Coating compositions, for example, paints, may be prepared by combining, e.g., mixing, and processing the components of the mineral blend in appropriate amounts (depending on the desired composition) with liquid vehicle (e.g., water), binder and any desired additives. The various components may be processed by mixing or milling or in a high-speed dispersion tank in which the premixed components are subjected to high-speed agitation by a circular, toothed blade attached to a rotating shaft.

Substrates

The substrate may be an article of manufacture. For example, the substrate may be a handicraft item, an item of furniture, a vehicle (for example a vehicle body), a sea-going vessel, or piping.

The substrate may be a surface. For example, the substrate may be a surface of a constructional element, such as an interior or exterior wall, a ceiling or a floor of a dwelling place, outside fencing, trimming, and the like.

Method of Coating Substrates

The coating composition, for example, paint, may be applied to the substrate by one or more coating techniques which would be evident to a person skilled in the art, such as, for example, painting or spray-coating the coating composition onto the substrate or dipping the substrate into the coating composition.

For the avoidance of doubt, the present application is directed to the subject-matter described in the following numbered paragraphs:

1. Coating composition comprising a mineral blend and no greater than about 1.0 wt. % $TiO_2$, based on the total weight of the coating composition, wherein the mineral blend comprises:
ground calcium carbonate as a matting mineral, a whitening mineral or both; and calcined kaolin, for example flash calcined kaolin, as an opacifying mineral, a whitening mineral or both.

2. The coating composition according to numbered paragraph 1, wherein the ground calcium carbonate has a $d_{50}$ of at least about 2.0 μm.

3. The coating composition according to numbered paragraph 1 or numbered paragraph 2, wherein the calcined kaolin has a $d_{50}$ of at least about 0.5 μm.

4. The coating composition according to any one preceding numbered paragraph comprising at least about 5 wt. % ground calcium carbonate, based on the total weight of the coating composition.

5. The coating composition according to numbered paragraph 4 comprising from about 5 wt. % to about 15 wt. % ground calcium carbonate, based on the total weight of the coating composition.

6. The coating composition according to any one preceding numbered paragraph comprising at least about 10 wt. % calcined kaolin, for example flash calcined kaolin, based on the total weight of the coating composition.

7. The coating composition according to numbered paragraph 6 comprising from about 10 wt. % to about 25 wt. % calcined kaolin, for example flash calcined kaolin, based on the total weight of the coating composition.

8. The coating composition according to any one preceding numbered paragraph comprising at least about 35 wt. % of the mineral blend, based on the total weight of the coating composition.

9. The coating composition according to any one preceding numbered paragraph, wherein the mineral blend comprises at least one further mineral from the following group: hydrous kaolin as an opacifying mineral, precipitated calcium carbonate as an opacifying mineral and/or whitening mineral, natural diatomaceous earth as a matting mineral and/or opacifying mineral, flux calcined diatomaceous earth as a matting mineral and/or opacifying mineral, talc as a matting mineral and/or opacifying mineral, wollastonite as a matting mineral, perlite as a matting mineral, mica as a matting mineral, quartz as a matting mineral, chlorite as a matting mineral.

10. The coating composition according to any one preceding numbered paragraph comprising from about 10 wt. % to about 35 wt. %, for example from about 15 wt. % to about 30 wt. %, of opacifying minerals, based on the total weight of the coating composition.

11. The coating composition according to any one preceding numbered paragraph comprising from about 5 wt. % to about 25 wt. %, for example from about 8 wt. % to about 20 wt. %, of matting minerals, based on the total weight of the coating composition.

12. The coating composition according to any one preceding numbered paragraph comprising from about 3 wt. % to about 25 wt. %, for example from about 5 wt. % to about 20 wt. %, of whitening minerals, based on the total weight of the coating composition.

13. The coating composition according to any one preceding numbered paragraph, further comprising binder.

14. The coating composition according to numbered paragraph 13, having a PVC of (i) at least the CPVC, or (ii) at least about 130.0% of the CPVC, or (iii) at least about 150.0% of the CPVC.

15. The coating composition according to numbered paragraph 13 or numbered paragraph 14, wherein the coating composition is paint, and wherein the paint has:
an opacity of at least about 95.0%, for example at least about 97.0%, at 8 $m^2$/L according to ISO 6504-3; and
85° gloss at 100 μm wet film thickness of no greater than about 7.0 according to ISO 2813, for example, at a PVC of at least about 60%; and optionally
L* of at least about 95.0 at 1500 μm wet film thickness and/or a scrub resistance in Class 1 or Class 2 according to ISO 11998 or Type A or Type B according to BS 3900.

16. Paint which is substantially free of $TiO_2$, the paint comprising a mineral blend and binder, and having:
an opacity of at least about 95.0%, for example at least about 97.0%, at 8 $m^2$/L according to ISO 6504-3; and
85° gloss at 100 μm wet film thickness of no greater than about 7.0 according to ISO 2813, for example, at a PVC of at least about 60%; and optionally L* of at least about 95.0 at 1500 μm wet film thickness and/or a scrub in Class 1 or Class 2 according to ISO 11998 or Type A or Type B according to BS 3900.

17. Substrate coated with a coating composition, for example, paint, according to any one of numbered paragraphs 1 to 16.

18. Use of a mineral blend comprising ground calcium carbonate and calcined kaolin, for example flash calcined kaolin, in a $TiO_2$-free paint having:

an opacity of at least about 95.0%, for example at least about 97.0%, at 8 $m^2$/L according to ISO 6504-3; and 85° gloss at 100 μm wet film thickness of no greater than about 7.0 according to ISO 2813, for example, at a PVC of at least about 60%; and optionally L* of at least about 95.0 at 1500 μm wet film thickness and/or a scrub resistance in Class 1 or Class 2 according to ISO 11998 or Type A or Type B according to BS 3900.

19. Mineral blend for use in a $TiO_2$-free paint, the mineral blend comprising, based on the total weight of the mineral blend:

between about 10 wt. % and about 40 wt. %, for example between about 10 wt. % and about 35 wt. %, of calcium carbonate as a matting mineral, a whitening mineral or both;

between about 20 wt. % and about 60 wt. %, for example between about 20 wt. % and about 50 wt. %, of calcined kaolin, for example flash calcined kaolin, as an opacifying mineral, a whitening mineral or both; and less than about 3.0 wt. % $TiO_2$.

20. Mineral blend for use in a $TiO_2$-free paint, the mineral blend comprising, based on the total weight of the mineral blend:

between about 35 wt. % and about 65 wt. %, for example between about 45 wt. % and about 60 wt. %, of opacifying minerals;

between about 10 wt. % and about 45 wt. %, for example between about 15 wt. % and about 40 wt. %, of matting minerals;

between about 10 wt. % and about 45 wt. %, for example between about 10 wt. % and about 35 wt. %, of whitening minerals; and less than about 3.0 wt. % $TiO_2$.

EXAMPLES

In each of the following examples, reference is made to Tables 1, 2, 3, and 4, in which:

Table 1 provides the mineral compositions (in weight %, based on the total weight of the mineral blend) of six example mineral blends;

Table 2 provides the compositions of seven example paints (in weight %, based on the total weight of the paint composition) made using the six mineral blends of Table 1;

Table 3 provides measured values of opacity (measured according to ISO 6504-3 and ISO 6504/1 standards), 85° gloss, CIELAB L* and b*, and scrub resistance class (measured according to BS 3900 standards) for each of the seven example paints of Table 2; and Table 4 provides mineral composition, mean particle size (i.e. $d_{50}$, as determined by sedigraph unless labelled by an asterisk (*) in which case as determined by laser light scattering), their BET surface area, particle morphology and mineral role for each of the proprietary mineral products or blends referred to in Tables 1 to 3.

Paint Example 1

Paint Example 1 was prepared by combining Mineral Blend Example 1 (having the composition set out in Table 1) with water, 25% ammonia ($NH_3$) solution, defoamer BYK-024, dispersant Ecodis™ P 90, biocide Acticide® MBS, cellulosic thickener Natrosol™ 250 HR, acrylic binder resin Acronal® S790, coalescent Texanol™ and associative thickener Acrysol™ TT-935 ER (provided as a 50% aqueous solution) in the proportions set out in Table 2.

The opacity, 85° gloss, CIELAB L* and b*, and scrub resistance of Paint Example 1 were measured and are set out in Table 3.

Paint Example 2

Paint Example 2 was prepared by combining Mineral Blend Example 2 (having the composition set out in Table 1) with water, 25% ammonia ($NH_3$) solution, defoamer BYK-024, dispersant Ecodis™ P 90, biocide Acticide® MBS, cellulosic thickener Natrosol™ 250 HR, acrylic binder resin Acronal® S790, coalescent Texanol™ and associative thickener Acrysol™ TT-935 ER (provided as a 50% aqueous solution) in the proportions set out in Table 2.

The opacity, 85° gloss, CIELAB L* and b*, and scrub resistance of Paint Example 2 were measured and are set out in Table 3.

Paint Example 3A

Paint Example 3A was prepared by combining Mineral Blend Example 3 (having the composition set out in Table 1) with water, 25% ammonia ($NH_3$) solution, defoamer BYK-024, dispersant Ecodis™ P 90, biocide Acticide® MBS, cellulosic thickener Natrosol™ 250 HR, acrylic binder resin Acronal® S790, coalescent Texanol™ and associative thickener Acrysol™ TT-935 ER (provided as a 50% aqueous solution) in the proportions set out in Table 2.

The opacity, 85° gloss, CIELAB L* and b*, and scrub resistance of Paint Example 3A were measured and are set out in Table 3.

Paint Example 3B

Paint Example 3B was prepared by combining Mineral Blend Example 3 (having the composition set out in Table 1) with water, 25% ammonia ($NH_3$) solution, defoamer BYK-024, dispersant Ecodis™ P 90, biocide Acticide® MBS, cellulosic thickener Natrosol™ 250 HR, acrylic binder resin Acronal® S790, coalescent Texanol™ and associative thickener Acrysol™ TT-935 ER (provided as a 50% aqueous solution) in the proportions set out in Table 2.

The opacity, 85° gloss, CIELAB L* and b*, and scrub resistance of Paint Example 3B were measured and are set out in Table 3.

Paint Example 4

Paint Example 4 was prepared by combining Mineral Blend Example 4 (having the composition set out in Table 1) with water, 25% ammonia ($NH_3$) solution, defoamer BYK-024, dispersant Ecodis™ P 90, biocide Acticide® MBS, cellulosic thickener Natrosol™ 250 HR, acrylic binder resin Acronal® S790, coalescent Texanol™ and associative thickener Acrysol™ TT-935 ER (provided as a 50% aqueous solution) in the proportions set out in Table 2.

The opacity, 85° gloss, CIELAB L* and b*, and scrub resistance of Paint Example 4 were measured and are set out in Table 3.

Paint Example 5

Paint Example 5 was prepared by combining Mineral Blend Example 5 (having the composition set in Table 1) with water, 25% ammonia ($NH_3$) solution, defoamer BYK-024, dispersant Ecodis™ P 90, biocide Acticide® MBS, cellulosic thickener Natrosol™ 250 HR, acrylic binder resin Acronal® S790, coalescent Texanol™ and associative thickener Acrysol™ TT-935 ER (provided as a 50% aqueous solution) in the proportions set out in Table 2.

The opacity, 85° gloss, CIELAB L* and b*, and scrub resistance of Paint Example 5 were measured and are set out in Table 3.

Paint Example 6

Paint Example 6 was prepared by combining Mineral Blend Example 6 (having the composition set out in Table 1) with water, 25% ammonia ($NH_3$) solution, defoamer BYK-024, dispersant Ecodis™ P 90, biocide Acticide® MBS, cellulosic thickener Natrosol™ 250 HR, acrylic binder resin Acronal® S790, coalescent Texanol™ and associative thickener Acrysol™ TT-935 ER (provided as a 50% aqueous solution) in the proportions set out in Table 2.

The opacity, 85° gloss, CIELAB L* and b*, and scrub resistance of Paint Example 6 were measured and are set out in Table 3.

TABLE 1

| | Mineral Blend Examples | | | | | |
|---|---|---|---|---|---|---|
| | 1 | 2 | 3 | 4 | 5 | 6 |
| | Weight % | | | | | |
| M1 | 10.5 | 10.5 | 18 | 15 | 0 | 0 |
| M2 | 8.25 | 8.25 | 27 | 0 | 17 | 0 |
| M3 | 8.25 | 8.25 | 0 | 0 | 0 | 0 |
| M4 | 0 | 0 | 0 | 0 | 29 | 0 |
| M5 | 23 | 0 | 0 | 0 | 0 | 0 |
| M6 | 0 | 23 | 28 | 27 | 50 | 50 |
| M7 | 23 | 23 | 0 | 6 | 0 | 0 |
| M8 | 0 | 0 | 0 | 25 | 0 | 0 |
| M9 | 23 | 23 | 23 | 23 | 0 | 0 |
| M10 | 0 | 0 | 0 | 0 | 0 | 31 |
| M11 | 0 | 0 | 0 | 0 | 0 | 19 |
| M12 | 4 | 4 | 4 | 4 | 4 | 0 |
| Total | 100 | 100 | 100 | 100 | 100 | 100 |

TABLE 2

| | Paint Examples | | | | | | |
|---|---|---|---|---|---|---|---|
| | 1 | 2 | 3A | 3B | 4 | 5 | 6 |
| | Weight % | | | | | | |
| Water | 37.49 | 37.49 | 37.52 | 42.07 | 37.71 | 37.45 | 37.45 |
| $NH_3$ 25% | 0.15 | 0.15 | 0.15 | 0.1 | 0.15 | 0.15 | 0.15 |
| BYK-024 | 0.3 | 0.3 | 0.3 | 0.3 | 0.3 | 0.3 | 0.3 |
| Ecodis™ P 90 | 0.4 | 0.4 | 0.4 | 0.4 | 0.4 | 0.4 | 0.4 |
| Acticide ® MBS | 0.1 | 0.1 | 0.1 | 0.1 | 0.1 | 0.1 | 0.1 |
| Natrosol™ 250 HR | 0.26 | 0.26 | 0.23 | 0.23 | 0.14 | 0.30 | 0.30 |
| Acronal ® S790 | 11.0 | 11.0 | 11.0 | 10.2 | 11.0 | 11.0 | 11.0 |
| Texanol™ | 1.4 | 1.4 | 1.4 | 1.4 | 1.4 | 1.4 | 1.4 |
| Acrysol™ TT-935 ER (50% in $H_2O$) | 0.9 | 0.9 | 0.9 | 1.1 | 0.8 | 0.9 | 0.9 |
| M1 | 5.0 | 5.0 | 8.5 | 7.7 | 7.0 | 0.0 | 0.0 |
| M2 | 4.0 | 4.0 | 13.0 | 11.9 | 0.0 | 8.0 | 0.0 |
| M3 | 4.0 | 4.0 | 0.0 | 0.0 | 0.0 | 0.0 | 0.0 |
| M4 | 0.0 | 0.0 | 0.0 | 0.0 | 0.0 | 14.0 | 0.0 |
| M5 | 11.0 | 0.0 | 0.0 | 0.0 | 0.0 | 0.0 | 0.0 |
| M6 | 0.0 | 11.0 | 13.5 | 12.6 | 13.0 | 24.0 | 24.0 |
| M7 | 11.0 | 11.0 | 0.0 | 0.0 | 3.0 | 0.0 | 0.0 |
| M8 | 0.0 | 0.0 | 0.0 | 0.0 | 12.0 | 0.0 | 0.0 |
| M9 | 11.0 | 11.0 | 11.0 | 10.1 | 11.0 | 0.0 | 0.0 |
| M10 | 0.0 | 0.0 | 0.0 | 0.0 | 0.0 | 0.0 | 15.0 |
| M11 | 0.0 | 0.0 | 0.0 | 0.0 | 0.0 | 0.0 | 9.0 |
| M12 | 2.0 | 2.0 | 2.0 | 1.8 | 2.0 | 2.0 | 0.0 |
| Total | 100.0 | 100.0 | 100.0 | 100.0 | 100.0 | 100.0 | 100.0 |
| PVC, % | 79.1 | 78.1 | 78.2 | 78 | 78 | 78.2 | 78.5 |

TABLE 3

| | Paint Examples | | | | | | |
|---|---|---|---|---|---|---|---|
| | 1 | 2 | 3A | 3B | 4 | 5 | 6 |
| ISO 6504-3 Opacity @ 8 m²/L (in %) | 97.0 | 97.4 | nt | 97.1 | 98.2 | 97.6 | 97.8 |
| ISO 6504/1 Opacity @ 8 m²/L (in %) | 97.8 | 98.0 | 98.6 | nt | 98.3 | 98.1 | nt |
| 85° Gloss @ 100 μm wet film thickness | 4.1 | 3.5 | 3.2 | 3.4 | 5.3 | 3.4 | 3.6 |
| L* @ 1500 μm wet film thickness | 95.8 | 96.5 | 95.1 | 95 | 96.3 | 96.1 | 96.7 |
| b* @ 1500 μm wet film thickness | 2.5 | 2.5 | 2.5 | 2.5 | 2.9 | 2.2 | 2.3 |
| BS 3900 scrub resistance type (200 cycles) | A | A | A | nt | B | nt | nt | nt = not tested

TABLE 4

| | Mineral | $d_{50}$ (μm) | Surface area BET (m²/g) | Particle morphology | Mineral role |
|---|---|---|---|---|---|
| M1 | Hydrous kaolin | 0.7 | 14.0 | Platey/Fine | Opacifying |
| M7 | Precipitated calcium carbonate | ~1.5 | 10.0 | Porous/Internal pores | |
| M6 | Calcined kaolin | 1.1 | 10.5 | Porous/External pores | |
| M5 | Flash calcined kaolin | 1.6 | 11.0 | Porous/Internal & External pores | |
| M11 | Flux calcined diatomaceous earth | 15* | 2.0 | Porous/Disc/Coarse | Matting |
| M2 | Talc | 9.4 | 2.7 | Platey/Coarse | |
| M3 | Ground calcium carbonate | 11 | 1.3 | Blocky/Coarse | |
| M8 | Wollastonite | 4.5* | 3.0 | Needle | |
| M12 | Perlite | 25* | 4.7 | 3D particle shapes | |
| M4 | Ground calcium carbonate | 6.5 | 1.3 | Blocky/Coarse | Matting/Whitening |
| M10 | Ground calcium carbonate | 2.7 | 4.4 | Blocky/Fine | Whitening |
| M9 | Ground calcium carbonate | 4.7 | 1.7 | Blocky/Medium | Whitening |

*= determined by laser light scattering

The invention claimed is:

1. A coating composition comprising a mineral blend and no greater than about 0.5 wt. % TiO₂, based on the total weight of the coating composition,
wherein the mineral blend comprises:
ground calcium carbonate as a matting mineral, a whitening mineral, or both; and
calcined kaolin as an opacifying mineral, a whitening mineral, or both, and
wherein the ground calcium carbonate is blocky and non-porous and has a $d_{50}$ of 3.0-7.0 μm.

2. The coating composition according to claim 1, wherein the calcined kaolin has a $d_{50}$ of at least about 0.5 μm.

3. The coating composition according to claim 1, wherein the coating composition comprises at least about 5 wt. % ground calcium carbonate, based on the total weight of the coating composition.

4. The coating composition according to claim 1, wherein the coating composition comprises at least about 10 wt. % calcined kaolin, based on the total weight of the coating composition.

5. The coating composition according to claim 1, wherein the coating composition comprises at least about 35 wt. % of the mineral blend, based on the total weight of the coating composition.

6. The coating composition according to claim 1, further comprising a PVC from about 60% to about 90%.

7. The coating composition according to claim 1, wherein the mineral blend comprises at least one further mineral from the following group: hydrous kaolin as an opacifying mineral, precipitated calcium carbonate as an opacifying mineral and/or whitening mineral, natural diatomaceous earth as a matting mineral and/or opacifying mineral, flux calcined diatomaceous earth as a matting mineral and/or opacifying mineral, talc as a matting mineral and/or opacifying mineral, wollastonite as a matting mineral, perlite as a matting mineral, mica as a matting mineral, quartz as a matting mineral, chlorite as a matting mineral.

8. The coating composition according to claim 1, wherein the coating composition comprises from about 10 wt. % to about 35 wt. % of opacifying minerals, based on the total weight of the coating composition.

9. The coating composition according to claim 1, wherein the coating composition comprises from about 5 wt. % to about 25 wt. %, of matting minerals, based on the total weight of the coating composition.

10. The coating composition according to claim 1, wherein the coating composition comprises from about 3 wt. % to about 25 wt. % of whitening minerals, based on the total weight of the coating composition.

11. The coating composition according to claim 1, wherein the coating composition is paint, and wherein the paint has: an opacity of at least about 95.0% at 8 m2/L according to ISO 6504-3; and 85° gloss at 100 μm wet film thickness of no greater than about 7.0 according to ISO 2813.

12. A substrate coated with a coating composition according to claim 1.

13. The coating composition according to claim 1 wherein the mineral blend comprises, based on the total weight of the mineral blend:
between about 10 wt. % and about 40 wt. of calcium carbonate as a matting mineral, a whitening mineral or both;
between about 20 wt. % and about 60 wt. of calcined kaolin as an opacifying mineral, a whitening mineral or both; and
less than about 0.5 ~wt. % TiO₂.

14. The coating composition according to claim 1 wherein the mineral blend comprises, based on the total weight of the mineral blend:
between about 35 wt. % and about 65 wt. %, of opacifying minerals;
between about 10 wt. % and about 45 wt. %, of matting minerals;
between about 10 wt. % and about 45 wt. of whitening minerals; and
less than about 0.5~wt. % TiO₂.

15. The coating composition according to claim 2, wherein the coating composition comprises at least about 5 wt. % ground calcium carbonate and at least about 10 wt. % calcined kaolin, based on the total weight of the coating composition.

16. The coating composition according to claim 15, wherein the coating composition comprises at least about 35 wt. % of the mineral blend, based on the total weight of the coating composition.

17. The coating composition according to claim 16, wherein the coating composition comprises:
   from about 15 wt. % to about 30 wt. % of opacifying minerals,
   from about from about 8 wt. % to about 20 wt. % of matting minerals, and
   from about 5 wt. % to about 20 wt. %, of whitening minerals,
   based on the total weight of the coating composition.

18. A coating composition according to claim 16, wherein the coating composition has an opacity of at least about 97.0%, at 8 m2/L according to ISO 6504-3; and 85° gloss at 100 μm wet film thickness of no greater than about 7.0 according to ISO 2813.

* * * * *